(12) United States Patent
Shakarian et al.

(10) Patent No.: US 11,892,897 B2
(45) Date of Patent: Feb. 6, 2024

(54) SYSTEMS AND METHODS FOR PREDICTING WHICH SOFTWARE VULNERABILITIES WILL BE EXPLOITED BY MALICIOUS HACKERS TO PRIORITIZE FOR PATCHING

(71) Applicant: Arizona Board of Regents on Behalf of Arizona State University, Tempe, AZ (US)

(72) Inventors: Paulo Shakarian, Tempe, AZ (US); Mohammed Almukaynizi, Tempe, AZ (US); Jana Shakarian, Tempe, AZ (US); Eric Nunes, Tempe, AZ (US); Krishna Dharaiya, Tempe, AZ (US); Manoj Balasubramaniam Senguttuvan, Tempe, AZ (US); Alexander Grimm, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 413 days.

(21) Appl. No.: 16/640,878

(22) PCT Filed: Oct. 26, 2018

(86) PCT No.: PCT/US2018/057812
§ 371 (c)(1),
(2) Date: Feb. 21, 2020

(87) PCT Pub. No.: WO2019/089389
PCT Pub. Date: May 9, 2019

(65) Prior Publication Data
US 2020/0356675 A1 Nov. 12, 2020

Related U.S. Application Data

(60) Provisional application No. 62/581,123, filed on Nov. 3, 2017.

(51) Int. Cl.
*G06F 21/57* (2013.01)
*G06F 11/00* (2006.01)
(Continued)

(52) U.S. Cl.
CPC ........ *G06F 11/008* (2013.01); *G06F 18/2148* (2023.01); *G06F 18/24* (2023.01);
(Continued)

(58) Field of Classification Search
CPC .................................................. G06F 21/577
See application file for complete search history.

(56) References Cited

U.S. PATENT DOCUMENTS

| | | | |
|---|---|---|---|
| 7,424,619 B1 * | 9/2008 | Fan | G06F 21/552 713/188 |
| 9,294,498 B1 | 3/2016 | Yampolskiy et al. | |

(Continued)

FOREIGN PATENT DOCUMENTS

| | | |
|---|---|---|
| WO | 2017137804 A1 | 8/2017 |
| WO | 2019157335 A1 | 8/2019 |

OTHER PUBLICATIONS

Nayak, et al., 2014. Some vulnerabilities are different than others. In International Workshop on Recent Advances in Intrusion Detection. Springer, 426-446.

(Continued)

*Primary Examiner* — Ponnoreay Pich
(74) *Attorney, Agent, or Firm* — POLSINELLI PC

(57) ABSTRACT

Various embodiments for predicting which software vulnerabilities will be exploited by malicious hackers and hence prioritized by patching are disclosed.

20 Claims, 13 Drawing Sheets

(51) Int. Cl.
  *G06F 21/54* (2013.01)
  *G06F 21/55* (2013.01)
  *G06F 18/24* (2023.01)
  *G06F 18/214* (2023.01)

(52) U.S. Cl.
  CPC ............ *G06F 21/54* (2013.01); *G06F 21/552* (2013.01); *G06F 21/577* (2013.01)

(56) References Cited

U.S. PATENT DOCUMENTS

| | | | |
|---|---|---|---|
| 9,692,778 | B1 | 6/2017 | Mohanty |
| 10,176,438 | B2 | 1/2019 | Shakarian et al. |
| 10,313,385 | B2 | 6/2019 | Shakarian et al. |
| 10,437,945 | B2 | 10/2019 | Shakarian et al. |
| 2006/0075503 | A1* | 4/2006 | Bunker ............... G06F 21/604 726/1 |
| 2007/0157311 | A1* | 7/2007 | Meier ................. G06F 21/577 726/22 |
| 2013/0097706 | A1* | 4/2013 | Titonis ............... G06F 21/566 726/22 |
| 2015/0244734 | A1* | 8/2015 | Olson ................. G06F 21/577 726/25 |
| 2016/0188880 | A1* | 6/2016 | Smith ................. G06F 21/577 726/23 |
| 2017/0041408 | A1* | 2/2017 | Kramer .................. H04W 4/21 |
| 2017/0214710 | A1* | 7/2017 | Seiver .................... H04L 63/10 |
| 2019/0019157 | A1* | 1/2019 | Saha ...................... G06N 20/00 |
| 2019/0026466 | A1* | 1/2019 | Krasser .................. G06N 7/01 |
| 2019/0347327 | A1 | 11/2019 | Patil et al. |
| 2019/0349393 | A1 | 11/2019 | Nunes et al. |
| 2020/0036743 | A1 | 1/2020 | Almukaynizi et al. |
| 2020/0356675 | A1* | 11/2020 | Shakarian ............ G06K 9/6267 |
| 2020/0364349 | A1 | 11/2020 | Nunes et al. |
| 2020/0410028 | A1 | 12/2020 | Shaabani et al. |

OTHER PUBLICATIONS

NIST. Last Accessed: May 2017. The National Institute of Standards and Technology. https://www.nist.gov/.
Nouh, et al., 2015. Identifying Key-Players in Online Activist Groups on the Facebook Social Network. In Data Mining Workshop (ICDMW), 2015 IEEE International Conference on. IEEE, 969-978.
Nunes, et al., 2016. Darknet and deepnet mining for proactive cybersecurity threat intelligence. In Intelligence and Security Informatics (ISI), 2016 IEEE Conference on. IEEE, 7-12.
NVD, Products>CPE. Last Accessed: May 2017. Official Common Platform Enumeration Dictionary. https://nvd.nist.gov/cpe.cfm.
Page, et al., 1999. The PageRank citation ranking: Bringing order to the web. Technical Report. Stanford InfoLab.
Pedregosa, et al., Scikit-learn: Machine learning in Python. Journal of Machine Learning Research 12, Oct. 2011, 2825-2830.
Phillips, et al., Extracting social structure from darkweb forums. 2015.
Sabottke, et al., 2015. Vulnerability Disclosure in the Age of Social Media: Exploiting Twitter for Predicting Real-World Exploits. In USENIX Security, vol. 15.
Samtani, et al., 2015. Exploring hacker assets in underground forums. In Intelligence and Security Informatics (ISI), 2015 IEEE International Conference on. IEEE, 31-36.
Samtani, et al., 2016. AZSecure Hacker Assets Portal: Cyber threat intelligence and malware analysis. In Intelligence and Security Informatics (ISI), 2016 IEEE Conference on. IEEE, 19-24.
Scarfone, et al., 2009. An analysis of CVSS version 2 vulnerability scoring. In Proceedings of the 2009 3rd International Symposium on Empirical Software Engineering and Measurement. IEEE Computer Society, 516-525.
SecurityFocus. Last Accessed: May 2017. SecurityFocus. http://www.securityfocus.com.
Shakarian, et al., 2016. Exploring malicious hacker forums. In Cyber Deception. Springer, 261-284.
Soska, et al., 2014. Automatically Detecting Vulnerable Websites Before They Turn Malicious. In Usenix Security. 625-640.
Stringhini, et al., 2015. Evilcohort: Detecting Communities of Malicious Accounts on Online Services. In Usenix Security. 563-578.
Symantec anti-virus attack signatures. Last Accessed: May 2017. https://www.symantec.com/security_response/landing/azlisting.jsp.
TippingPoint. Last Accessed: May 2017. The Zero Day Initiative. http://www.zerodayinitiative.com/.
Verizon Risk Team. 2015. 2015 Data Breach Investigations Report. (2015).
Virustotal. Last Accessed: May 2017. Virustotal. https://www.virustotal.com/.
Wikipedia. Last Accessed: May 2017. WannaCry ransomware attack. https://en.wikipedia.org/wiki/WannaCry_ransomware_attack.
Yamaguchi, et al., 2014. Modeling and discovering vulnerabilities with code property graphs. In Security and Privacy (SP), 2014 IEEE Symposium on. IEEE, 590-604.
Zhang, et al., Doina Caragea, and Xinming Ou. 2011. An empirical study on us-ing the national vulnerability database to predict software vulnerabilities. In International Conference on Database and Expert Systems Applications. Springer, 217-231.
International Search Report and Written Opinion from corresponding International Application No. PCT/US2018/057812, dated Feb. 21, 2019, 10 pages.
U.S. Appl. No. 16/548,329, filed Aug. 22, 2019, Tavabi et al.
U.S. Appl. No. 16/653,899, filed Oct. 15, 2019, Sarkar et al.
Pfleeger, et al., 2002. Security in computing. Prentice Hall Professional Technical Reference.
Robertson, et al., Darkweb Cyber Threat Intelligence Mining. Cambridge University Press. 2017.
Zafarani, et al., 2014. Social media mining: an introduction. Cambridge University Press.
Adobe. Last Accessed: May 2017. Adding priority ratings to adobe security bulletins. http://blogs.adobe.com/security/2012/02/when-do-i-need-to-apply-this-update-adding-priority-ratings-to-adobe-security-bulletins-2.html. (Last Accessed: May 2017).
Allodi, et al., 2012. A preliminary analysis of vulnerability scores for attacks in wild: the ekits and sym datasets. In Proceedings of the 2012 ACM Workshop on Building analysis datasets and gathering experience returns for security. ACM, 17-24.
Allodi, et al., Comparing vulnerability severity and exploits using case-control studies. ACM Transactions on Information and System Security (TISSEC) 17, 1, 2014.
Allodi, et al., Quantitative assessment of risk reduction with cybercrime black market monitoring, in Security and Privacy Workshops (SPW), 2013 IEEE. IEEE, 2013, pp. 165-172.
Allodi, et al., The Work-Averse Cyber Attacker Model. (2016).
Barreno, et al. 2008. Open problems in the security of learning. In Proceedings of the 1st ACM workshop on Workshop on AISec. ACM, 19-26.
Barreno, et al., The security of machine learning. Machine Learning 81, 2 (2010), 121-148.
Benjamin, et al., Exploring threats and vulnerabilities in hacker web: Forums, IRC and carding shops. In Intelligence and Security Informatics (ISI), 2015 IEEE International Conference on. IEEE, 85-90.
Beutel, et al., 2015. Fraud detection through graph-based user behavior modeling. In Proceedings of the 22nd ACM SIGSAC Conference on Computer and Communications Security. ACM, 1696-1697.
Biggio, et al., Support Vector Machines Under Adversarial Label Noise. ACML 20 (2011), 97-112, 2011.
Bilge, et al., 2012. Before we knew it: an empirical study of zero-day attacks in the real world. In Proceedings of the 2012 ACM conference on Computer and communications security. ACM, 833-844.
Bozorgi, et al., Beyond heuristics: learning to classify vulnerabilities and predict exploits, in Proceedings of the 16th ACM SIGKDD international conference on Knowledge discovery and data mining. ACM, 2010, pp. 105-114.
Breiman, Bagging Predictors. Machine Learning 24, 2 (1996), 123-140.

(56) References Cited

OTHER PUBLICATIONS

Breiman, Random Forests. Machine Learning 45, 1 (2001), 5-32.
Bullough, et al., 2017. Predicting exploitation of disclosed software vulnerabilities using open-source data. In Proceedings of the 2017 ACM International Workshop on Security and Privacy Analytics. ACM.
Cao, et al., 2012. Aiding the detection of fake accounts in large scale social online services. In Proceedings of the 9th USENIX conference on Networked Systems Design and Implementation. USENIX Association, 15-15.
Cao, et al., 2014. Uncovering large groups of active malicious accounts in online social networks. In Proceedings of the 2014 ACM SIGSAC Conference on Computer and Communications Security. ACM, 477-488.
Chawla, et al., SMOTE: Synthetic Minority Over-sampling Technique. J. Artif. Int. Res. 16, 1 (Jun. 2002), 321-357. http://dl.acm.org/citation.cfm?id=1622407.1622416.
Cisco 2016 Midyear Security Report. Last Accessed: May 2017. http://www.cisco.com/c/dam/m/en_ca/never-better/assets/files/midyear-security-report-2016.pdf.
CiscoTalos. Last Accessed: May 2017. https://www.talosintelligence.com/vulnerability_reports.
Contagio. Last Accessed: May 2017. http://contagiodump.blogspot.com/.
Cortes, et al., Support-Vector Networks. (1995), 273-297.
CVE. Last Accessed: May 2017. Common Vulnerabilities and Exposures: The Standard for Information Security Vulnerability Names. http://cve.mitre.org/.
Durumeric, et al., 2014. The matter of heartbleed. In Proceedings of the 2014 Conference on Internet Measurement Conference. ACM, 475-488.
Edkrantz, et al., 2015. Predicting Cyber Vulnerability Exploits with Machine Learning . . . In SCAI. 48-57.
Exploit Database by offensive security. Last Accessed: May 2017. https://www.exploit-db.com/.
Frei, et al., 2010. Modeling the security ecosystem-the dynamics of (in) security. In Economics of Information Security and Privacy. Springer, 79-106.
Galar, et al., 2012. A Review on Ensembles for the Class Imbalance Problem: Bagging-, Boosting-, and Hybrid-Based Approaches. IEEE Transactions on Systems, Man, and Cybernetics, Part C (Applications and Reviews) 42, 4 (Jul. 2012), 463-484. https://doi.org/10.1109/TSMCC.2011.2161285.
Google. Last Accessed: May 2017. Google Cloud Translation API Documentation. https://cloud.google.com/translate/docs/.
Guo, et al., Mutual information and minimum mean-square error in Gaussian channels. IEEE Transactions on Information Theory 51, 4 (2005), 1261-1282.
Hao, et al., 2016. PREDATOR: Proactive Recognition and Elimination of Domain Abuse at Time-of-Registration. In Proceedings of the 2016 ACM SIGSAC Conference on Computer and Communications Security. ACM, 1568-1579.
Holt, et al., Examining the social networks of malware writers and hackers. International Journal of Cyber Criminology 6, 1 (2012), 891.
Holt, et al., Exploring stolen data markets online: products and market forces. Criminal Justice Studies 23, 1 (2010), 33-50. https://doi.org/10.1080/14786011003634415 arXiv:http://dx.doi.org/10.1080/14786011003634415.
IARPA. Last Accessed: May 2017. Cyber-attack Automated Unconventional Sensor Environment (CAUSE). https://www.iarpa.gov/index.php/research-programs/cause. (Last Accessed: May 2017).
Larson. CNN Business, Researchers find possible North Korea link to massive cyberattack. Last Accessed: May 2017. http://money.cnn.com/2017/05/15/technology/wannacry-hack-responsible-hackers/.
Liu, et al., Cloudy with a Chance of Breach: Forecasting Cyber Security Incidents.
Marin, et al., 2016. Product offerings in malicious hacker markets. In Intelligence and Security Informatics (ISI), 2016 IEEE Conference on. IEEE, 187-189.
Mell, et al., A Complete Guide to the Common Vulnerability Scoring System. Last Accessed: May 2017. https://www.first.org/cvss/v2/guide.
Metasploit. Last Accessed: May 2017. https://www.metasploit.com/.
Microsoft Exploitability Index. https://technet.microsoft.com/en-us/security/cc998259.aspx. (Last Accessed: May 2017).
Mitre. Last Accessed: May 2017. CVE Numbering Authorities. https://cve.mitre.org/cve/cna.html.
Mittal, et al., 2016. CyberTwitter: Using Twitter to generate alerts for cybersecurity threats and vulnerabilities. In Advances in Social Networks Analysis and Mining (ASONAM), 2016 IEEE/ACM International Conference on. IEEE, 860-867.
Motoyama, et al., 2011. An Analysis of Underground Forums. In Proceedings of the 2011 ACM SIGCOMM Conference on Internet Measurement Conference (IMC '11). ACM, New York, NY, USA, 71-80. https://doi.org/10.1145/2068816.2068824.
Extended European Search Report issued in corresponding Application No. 18873277.0 dated Jul. 8, 2021, 8 pages.
Almukaynizi, et al., Proactive Identification of Exploits in the Wild Through Vulnerability Mentions Online, IEEE, pp. 82-88, 2017.
Office Action dated Dec. 6, 2022 in related Israeli Application No. 274307, 7 pages.
Office Action issued is related Israeli Application No. 274307 dated Dec. 6, 2022, 4 pages.

\* cited by examiner

SYSTEMS AND METHODS FOR PREDICTING WHICH SOFTWARE VULNERABILITIES WILL BE EXPLOITED BY MALICIOUS HACKERS TO PRIORITIZE FOR PATCHING

CROSS REFERENCE TO RELATED APPLICATIONS

This is a PCT application that claims benefit to U.S. provisional application Ser. No. 62/581,123 filed on Nov. 3, 2017 which is incorporated by reference in its entirety.

GOVERNMENT SUPPORT

This invention was made with government support under Contract No. N00014-15-1-2742 from the Office of Naval Research and Contract No. FA8750-16-C-0012 from the Intelligence Advanced Research Projects Activity (IARPA). The Government has certain rights in the invention.

FIELD

The present disclosure generally relates to assessing the likelihood of exploitation of software vulnerabilities, and in particular to systems and methods for predicting which software vulnerabilities will be exploited by malicious hackers and hence prioritized by patching.

BACKGROUND

An increasing number of software vulnerabilities are discovered and publicly disclosed every year. In 2016 alone, more than 10,000 vulnerability identifiers were assigned and at least 6,000 were publicly disclosed by the National Institute of Standards and Technology (NIST). Once the vulnerabilities are disclosed publicly, the likelihood of those vulnerabilities being exploited increases. With limited resources, organizations often look to prioritize which vulnerabilities to patch by assessing the impact it will have on the organization if exploited. Standard risk assessment systems such as Common Vulnerability Scoring System (CVSS), Microsoft Exploitability Index, Adobe Priority Rating report many vulnerabilities as severe and will be exploited to be on the side of caution. This does not alleviate the problem much since the majority of the flagged vulnerabilities will not be attacked.

Further, current methods for prioritizing patching vulnerabilities appear to fall short. Verizon reported that over 99% of breaches are caused by exploits to known vulnerabilities. Cisco also reported that "The gap between the availability and the actual implementation of such patches is giving attackers an opportunity to launch exploits." For some vulnerabilities, the time window to patch the system is very small. For instance, exploits targeting the Heartbleed bug in OpenSSL were detected in the wild 21 hours after the vulnerability was publicly disclosed. Hence, organizations need to efficiently assess vulnerabilities that will be exploited in the wild while keeping the false alarm rate low.

NIST provides the National Vulnerability Database (NVD) which comprises of a comprehensive list of vulnerabilities disclosed, but only a small fraction of those vulnerabilities (less than 3%) are found to be exploited in the wild—a result confirmed in the present disclosure. Further, previous work has found that the CVSS score provided by NIST is not an effective predictor of vulnerabilities being exploited. It has previously been proposed that other methods such as the use of social media, darkweb markets and certain white-hat websites would be suitable alternatives. However, this previous work has its limitations. For instance, methodical concerns on the use of social media for exploit prediction were recently raised; data feeds for proactive exploit prediction were limited to single sites that provided a relatively small number of predictions; and other work demonstrates the viability of data collection but does not quantify the results of prediction.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1A:
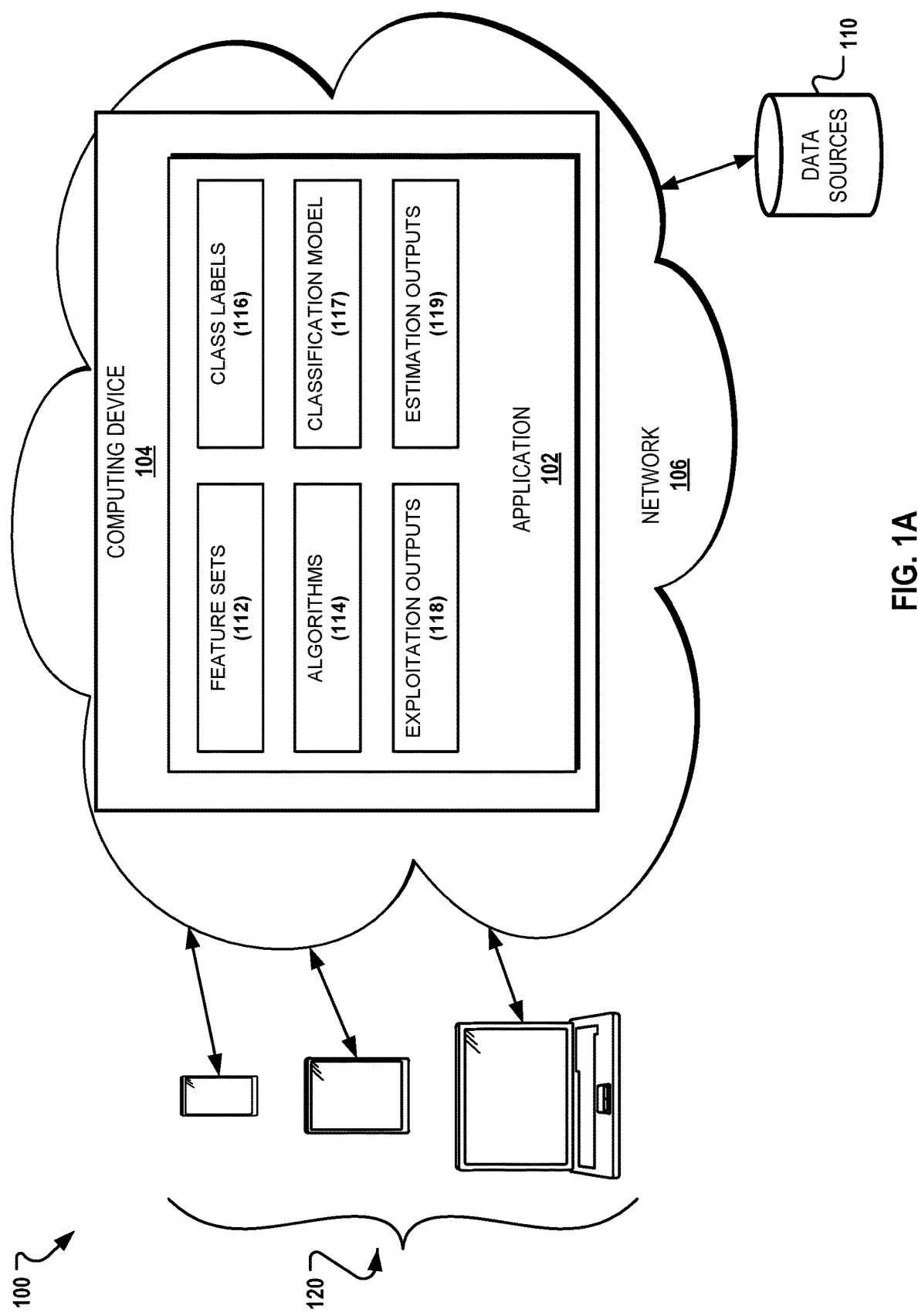
FIG. 1A is a network diagram illustrating an exemplary computer-implemented system for implementing vulnerability prediction as described herein, according to aspects of the present disclosure.

In the present disclosure, the ability to predict exploits in the wild is examined using cyber threat intelligence feeds comprised from a variety of data sources or data feeds. This problem is of direct relevance to patch prioritization. Referencing data gathered or otherwise accessed from darkweb and deepweb (DVV) and conducting much analysis on data feeds collected from various online sources (e.g., Security-Focus, Talos), and after over one hundred interviews with professionals working for managed security service providers (MSSP's), firms specializing in cyber risk assessment, and security specialists working for managed (IT) service providers (MSP's), many sources of data were identified that were representative of current threat intelligence used for vulnerability prioritization—examples being presented in FIG. 13. Amongst those, three are examined in embodiment A: (1) ExploitDB (EDB) contains information on proof-of-concepts for vulnerabilities provided by security researchers from various blogs and security reports, (2) Zero Day Initiative (ZDI) is curated by a commercial firm called TippingPoint and uses a variety of reported sources focused on disclosures by various software vendors and their security researchers, and (3) a collection of information scraped from over 120 sites on the darkweb and deepweb (DW) sites. The intuition behind each of these feeds was to not only utilize information that was aggregated over numerous related sources, but also to represent feeds commonly used by cybersecurity professionals.

The present disclosure demonstrates the utility of the developed machine learning models described herein in predicting exploits in the wild with True Positive Rate (TPR) of 90% while maintaining the False Positive Rate (FPR) less than 15% for a sample data examined by embodiment A. The present disclosure also compares the present system embodiment A to recent benchmarks for exploit prediction, demonstrating the achievement of significant high precision while maintaining the recall under the assumptions made in the present disclosure. The performance of variants of the present embodiment A was also examined in the case when temporal mixing is controlled, and in the case where only a single source is used. Robustness against adversarial data manipulation is also discussed.

Using vulnerability mentions on EDB, ZDI, and DW, the present disclosure further describes the increase in the vulnerability exploitation likelihood over vulnerabilities only disclosed on NVD. In addition, the present disclosure provides results that demonstrate the likelihood of being exploited given vulnerability mention on EDB is 9%, ZDI is 12% and DW is 14% as compared to NVD, which is 2.4%, and explains the availability of such information relative to the time an exploit is found in the wild.

The present disclosure also analyzes exploited vulnerabilities based on various other features derived from these data sources such as language used. It is specifically noted that Russian language sites on the darkweb discuss vulnerabilities that are 19 times more likely to be exploited than random, which was greater than other languages examined. Further research was made regarding the probability of exploitation with regard to both data sources and the vendor of the vulnerable software.

The present disclosure also presents an embodiment (embodiment B) that leverages machine learning techniques on features derived from the social network of users participating in darkweb/deepweb (DW) forums, as well as features derived from the National Vulnerability Database. It specifically demonstrates the viability of user connectivity metadata in predicting the likelihood of vulnerability exploitation with an F1 measure of 0.67 for a subset of software vulnerabilities mentioned in DW.

Vulnerability and Exploits

Vulnerability is a weakness in a software system that can be exploited by an attacker to compromise the confidentiality, integrity or availability of the system to cause harm. The National Institute of Standards and Technology (NIST) maintains a comprehensive list of publicly disclosed vulnerabilities in its National Vulnerability Database (NVD). NVD also provides information regarding the target softwares (CPE), severity rating (CVSS) in terms of exploitability and impact and the date the vulnerability was published.

An exploit is defined as a piece of code that modifies the functionality of a system using an existing vulnerability. We term the exploits that have been used to target systems in real-world by an attacker as real-world exploits. On the other hand, proof-of-concept exploits are developed to verify a disclosed vulnerability and might require addition of functionalities to be used in a real-world attack. Proof-of-concept exploits that are identified in the wild (real-world attacks) fall under real-world exploits. Although the chances of detecting real-world exploits if proof-of-concept is already present is high since attackers have a template assisting on implementing exploits, presence of proof-of-concept does not imply that it has been used in the wild.

Technical Challenges

There are known technical challenges including methodological issues with previous exploit prediction methods and studies. It is also noted that there is a balance between ensuring an evaluation is conducted under real-world conditions and conducting an evaluation on an adequate sample size. A review of some of these challenges is discussed below.

Class Imbalance. As described herein, around 2.4% of the reported vulnerabilities are exploited in real world attacks. This skews the distribution towards one class i.e. not exploited in the prediction problem. In such cases, standard machine learning approaches favor the majority class leading to poor performance on the minority class. The present disclosure examines over-sampling techniques (namely SMOTE) only on the training dataset to account for data with sever class imbalance and avoid making the classifier always favor the majority class. Only a marginal improvement is observed for some classifiers, while other classifiers have been negatively affected when tested on unsampled data.

Evaluating Models on Temporal Data. Machine learning models are evaluated by training the model on one set of data and then testing the model on another set that is assumed to be drawn from the same distribution. The data split can be done randomly or in a stratified manner where the class ratio is maintained in both training and testing. Yet, exploit prediction is a time dependent prediction problem. Hence splitting the data randomly, violates the temporal aspect of the data as events that happen in the future will now be used to predict events that happen in the past, which violates the sequential nature of vulnerability disclosure events. This leads to temporal intermixing of the data. In the results described and related to the embodiment systems presented in this disclosure, this temporal mixing was reduced or avoided in most experiments. However, in certain experiments, where sample size is very small, experiments were included where this is not controlled (as one of our ground-truth sources does not have date/time information). It was explicitly noted when this was the case.

Vulnerabilities Exploited Before Disclosure. For exploit prediction, the goal is to predict whether a disclosed vulnerability will be exploited in the future or not. Few vulnerabilities are exploited before they are disclosed, hence prediction for such vulnerabilities does not add any value to the goal of the problem. That being said, predicting exploits that have already been used in attacks is important because not all vulnerabilities are patched in a timely manner. Knowing what vulnerabilities are exploited in the wild can help organizations with their cyber defense strategies.

Limitations of Ground Truth. Attack signatures identified for exploits that were detected in the wild are reported by a well-known cyber defense firm, called Symantec. These are used as ground truth for the exploited vulnerabilities when evaluating the present embodiments described herein. This ground truth is not comprehensive as the distribution of the exploited vulnerabilities over software vendors is found to differ from that for overall vulnerabilities (i.e., vulnerabilities affect products run on Microsoft have well coverage as compared to other OS vendors). Although this source has coverage limitations, it was found to be the most reliable source for exploited vulnerabilities since it reports attack signatures for known vulnerabilities. To avoid over-fitting the machine learning model on this not-so-representative ground truth, the software vendor was omitted from the set of features that were examined in all experiments.

EXPLOIT PREDICTION MODEL

Figure 13:
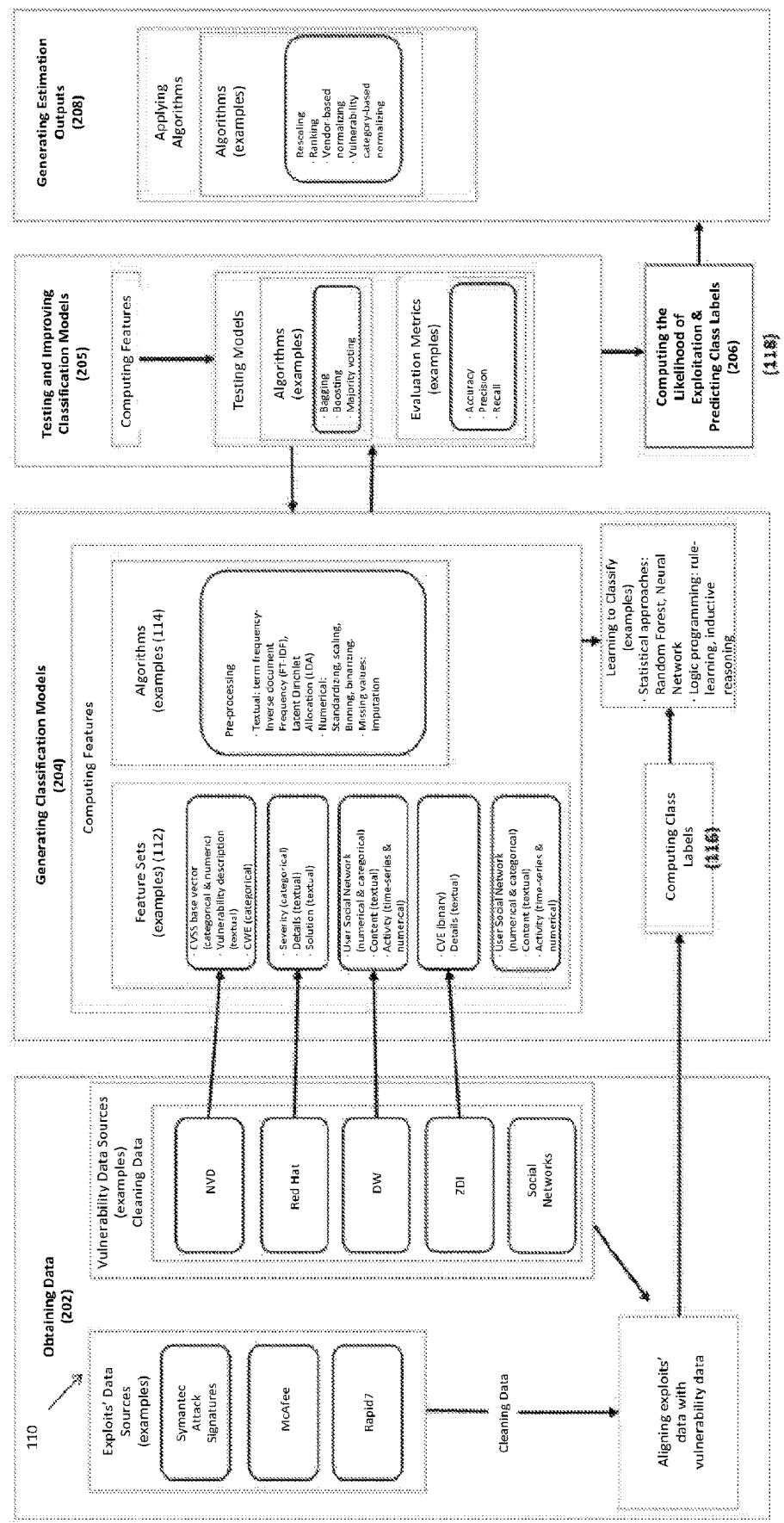
FIG. 13 is an overview of the prediction model, according to aspects of the present disclosure.
Figure 14:
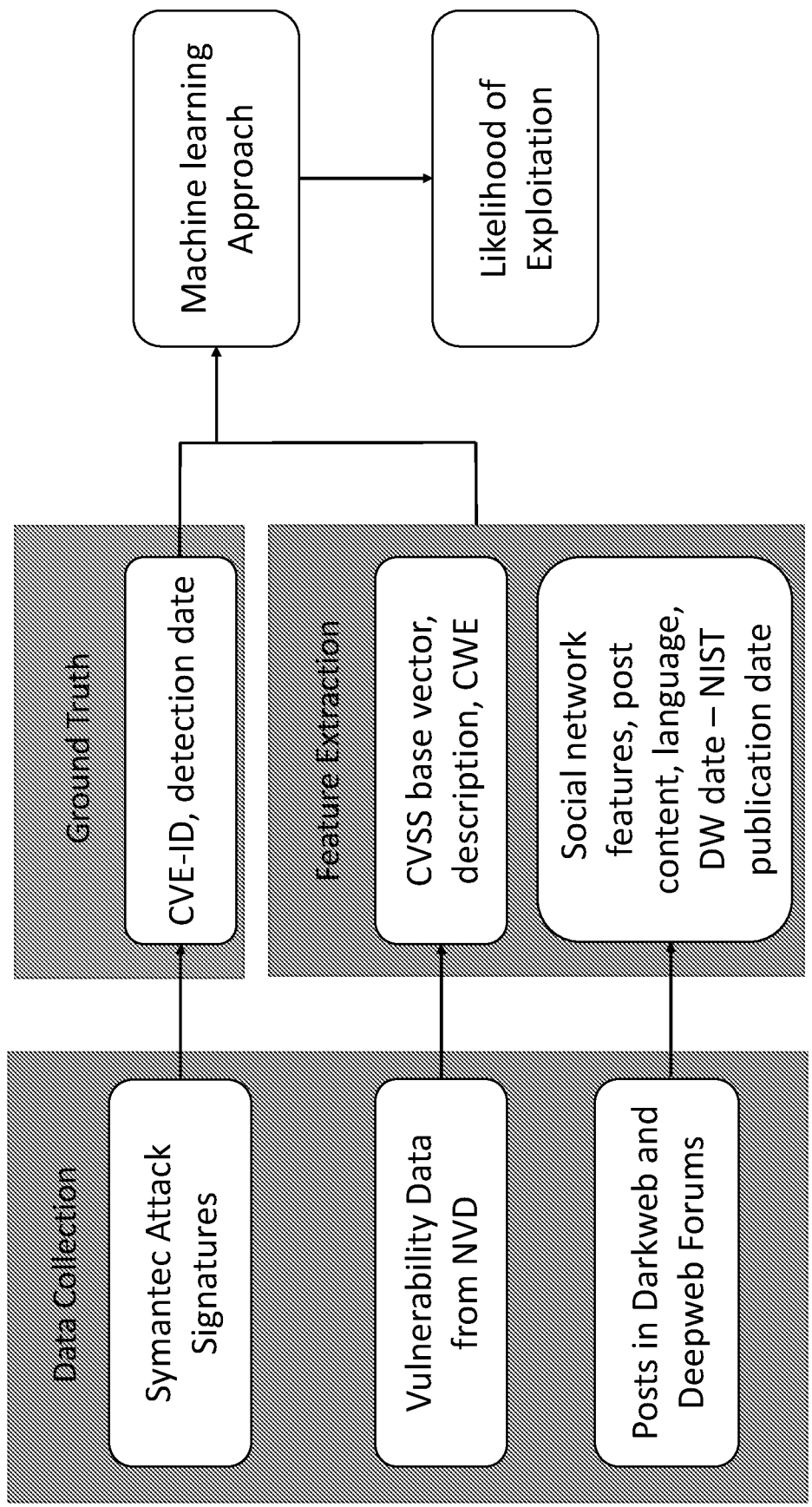
FIG. 14 is a simplified block diagram that illustrates a second embodiment (embodiment B) of the exploit prediction model, according to aspects of the present disclosure.

Predicting the likelihood of vulnerability exploitation through the usage of machine learning techniques has interesting security implications in terms of prioritizing which vulnerabilities need to be patched first to minimize risk of cyberattack. FIG. 13 provides an overview of an exploit prediction model proposed by the present disclosure; while FIG. 1B gives an overview of a first embodiment A of the exploit prediction model, and FIG. 14 gives an overview of a second embodiment B of the exploit prediction model.

Figure 1B:
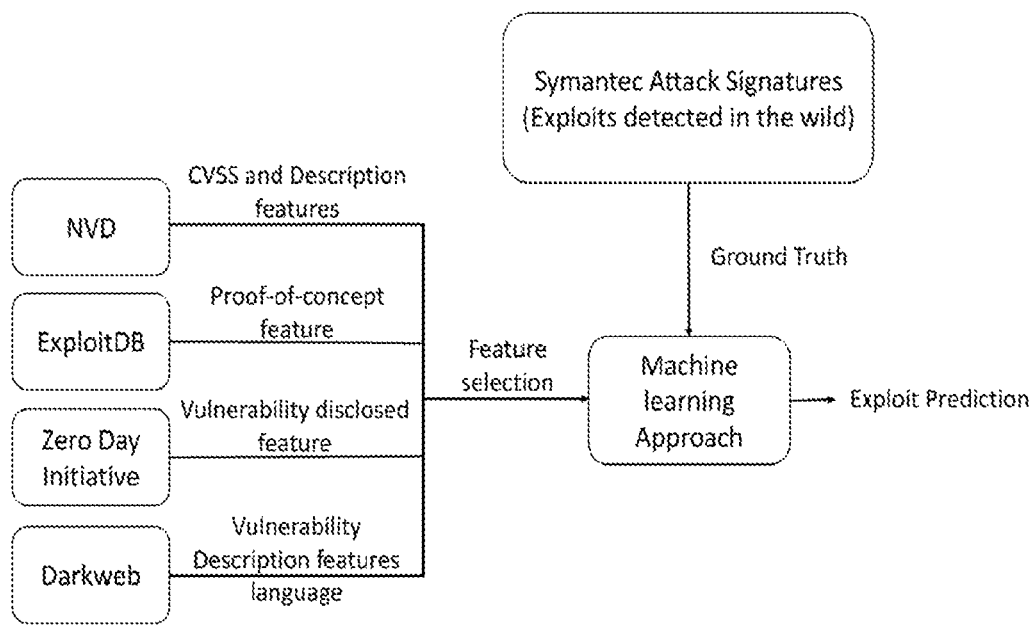
FIG. 1B is a simplified block diagram showing a first embodiment (embodiment A) of the exploit prediction model, according to aspects of the present disclosure.

Referring to FIG. 1A, an exemplary computer-implemented system (hereinafter "system") 100 for implementing functionality associated with exploit prediction is shown. The system 100 may be utilized to implement the embodiment A described herein, and/or the embodiment B described herein, or other such embodiments or models for exploit prediction. In general, the system 100 describes the configuration of at least one computing device for implementing the functionality associated with the exploit prediction embodiments described herein.

Specifically, in some embodiments, the system 100 may include and/or generally support functionality defined by an application 102, defining functionality associated with features of the exploit prediction model described herein. The application 102 may be hosted on or otherwise implemented using one or more of a computing device 104, which may include a server, a controller, a personal computer, a terminal, a workstation, a portable computer, a mobile device, a tablet, a mainframe, or other such computing device.

By installing, executing, or otherwise implementing the application 102, the computing device 104 is configured for administering, processing, and providing access to aspects of the application 102 via a network 106, which may include the Internet, an intranet, a virtual private network (VPN), and the like. In some embodiments, a cloud (not shown) may be implemented to execute one or more components of the system 100. In addition, aspects of the system 100 and/or the application 102 may be provided using platform as a service (PaaS), and/or software as a service (SaaS) using e.g., Amazon Web Services, or other distributed systems.

As further indicated in FIG. 1A and described herein, the computing device 104 and the application 102 may access information from one or more data sources 110 or data feeds. The application 102 may further implement functionality associated with the exploit prediction model defined by various modules; namely, a feature sets 112 module, an algorithms module 114, a class labels module 116, a classification model module 117, an exploitation outputs module 118 and an estimation outputs module 119. The aforementioned modules are merely exemplary and it is contemplated that the application 102 may define any number of related modules or features for implementing the functionality of the exploit prediction model described herein. Further, at least some features of the application 102 may be made available to a plurality of user devices 120 in communication with the computing device 104 of the system 100 and/or the local computing device 108 via the network 106.

The embodiments present in this disclosure consist of the following four phases, illustrated in FIG. 13:

Obtaining Data (202): Three of the data sources 110 are utilized in addition to NVD in embodiment A of this disclosure. These data sources include EDB (ExploitDB), ZDI (Zero Day Initiative) and data mined from DW (darkweb and deepnet) markets and forums focusing on malicious hacking. On the other hand, only a sample of DW sites may be used to show the viability of features derived from the properties of social network of users discussing vulnerabilities in DW as presented in embodiment B of this disclosure.

Computing Features and Class Labels (Generating Classification Models (204)): Features are extracted from each of the data sources 110. The features include, but are not limited to, bag of words features for vulnerability description and discussions on the DW, binary features which checks for the presence of proof-of-concept exploits in EDB, vulnerability disclosures in ZDI and DW. Additional features are included from NVD namely, CVSS score, CVSS vector, and CWE. The class labels are determined based on a ground truth data, which comprise a set of attack signatures of exploits detected in the wild, along with description of vulnerabilities leveraged by these exploits. This data may be obtained from Symantec.

Training the Classification Models (205)

Computing the Likelihood of Exploitation (206): In all embodiments presented in this disclosure, the problem is viewed as a binary classification problem, and several standard supervised machine learning approaches were evaluated and may be implemented.

Generating Estimation Outputs (208): Different algorithms can be used to present the results of the likelihood of exploitation. Among which are rescaling the results, ranking vulnerabilities, categorizing vulnerabilities under pre-determine categories.

Data Sources (110)

The present disclosure contemplates the combination of vulnerability and exploit information from multiple open source databases, namely: The National Vulnerability Database (NVD), The Exploit Database (EDB), Zero Day Initiative (ZDI), Darkweb database collected from mining darknet marketplaces and forums. For experiments related to the described model examined with respect to embodiment A, efforts were concentrated towards vulnerabilities disclosed in 2015 and 2016. Table 1 shows the vulnerabilities identified from each of the data sources between 2015 and 2016 as well as the number of vulnerabilities that were exploited in real-world attacks. The exploited vulnerabilities are used as ground truth for the described prediction experiments. A brief overview of each of the data sources used in embodiment A, including ground truth, is provided.

TABLE 1

Number of Vulnerabilities (2015-2016)

| Database | Vulnerabilities | Exploited | % Exploited |
| --- | --- | --- | --- |
| NVD | 12598 | 306 | 2.4% |
| EDB | 799 | 74 | 9.2% |
| ZDI | 824 | 95 | 11.5% |
| DW | 378 | 52 | 13.8% |

Figure 2:
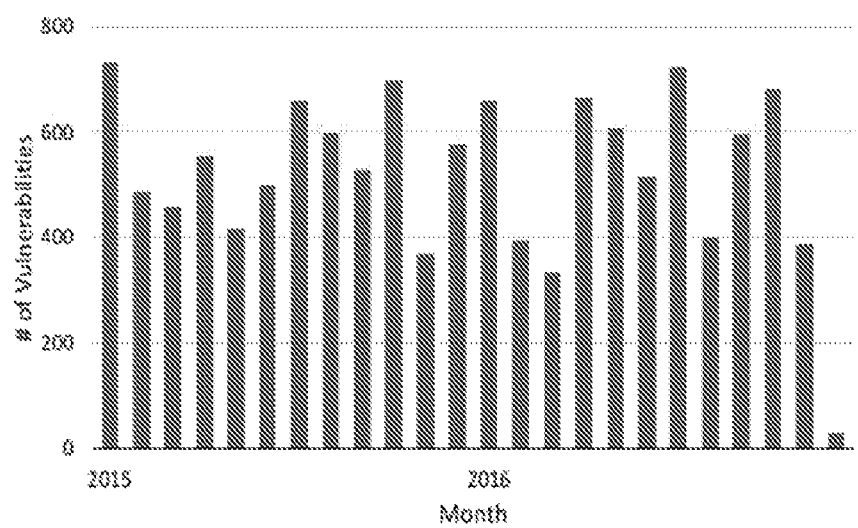
FIG. 2 is a graphical representation showing the vulnerabilities disclosed per month, according to data examined by embodiment A and aspects of the present disclosure.

NVD. The National Vulnerability Database maintains a database of publicly disclosed vulnerabilities each one identified using a unique CVE-ID. Vulnerabilities were collected as disclosed between 2015 and 2016. The resulting dataset is comprised of 12598 vulnerabilities. FIG. 2 shows the month wise disclosure of vulnerabilities. At the time of data collection there were only 30 vulnerabilities disclosed in December 2016, hence the small bar at the end of 2016. For each vulnerability, its description, CVSS score and vector are gathered. Organizations often use the CVSS score to prioritize which vulnerabilities to patch. The CVSS vector lists the components from which the score is computed. The components of the vector include Access Complexity, Authentication, Confidentiality, Integrity and Availability. Access complexity indicates how difficult is to exploit the vulnerability once the attacker has gained access to the target system. It is defined in terms of three levels: High, Medium and Low. Authentication indicates whether authentication is required by the attacker to exploit the vulnerability. It is a binary identifier taking the values Required and Not Required. Confidentiality, Integrity and Availability indicate what loss the system would incur if the vulnerability is exploited. It takes the values None, Partial and Complete.

EDB (white-hat community). Exploit Database is a collection of proof-of-concept exploits maintained by Offensive Security Training that has CVE's associated with available exploits. Using the unique CVE-ID's from the NVD database for the time period between 2015 and 2016, the EDB was queried to find whether a proof-of-concept exploit was available. The date the proof-of-concept exploit was also recorded and posted for these experiments. Using the CVE ID's from NVD, we query EDB to find 799 vulnerabilities with verified proof-of-concepts.

ZDI (vulnerability detection community). Zero Day Initiative launched by TippingPoint maintains a database of vulnerabilities submitted by security researchers. The submitted vulnerability is first verified before it is added to the database. Monetary incentive is provided if the vulnerability is verified to the researcher. ZDI then notifies the vendor to develop patches for the vulnerability before public disclosure. The ZDI database was queried to collect information regarding vulnerabilities that might have been disclosed by ZDI. Between 2015 and 2016, the query returned 824 vulnerabilities common between NVD and ZDI. The disclosed vulnerabilities were also made of note.

DW (black-hat community). The data collection infrastructure was summarized. In the present disclosure, the exploit prediction model may be implemented to crawl websites on DW, both marketplaces and forums, to collect data relating to malicious hacking. Sites are first identified before developing scripts for automatic data collection. A site is being put forward to script development after it has been established that the content is of interest (hacking-related) and relatively stable. The population size of the site is being observed, though not much decisive power is assigned to it. While a large population is an indicator for the age and stability of the site, a small population number can be associated with higher-value information (closed forums). While it would be incorrect to label forum users as criminals, there are clearly users communicating malicious intent and sometimes malicious code is exchanged.

Users in DW advertise and sell their wares on marketplaces. Hence, DW marketplaces provide a new avenue to gather information about vulnerabilities and exploits. Forums on the other hand, feature discussions on newly discovered vulnerabilities and exploits kits. Data related to malicious hacking is filtered from the noise and added to a database using a machine learning approach with high precision and recall. Not all exploits or vulnerability items in the database have a CVE number associated with them. First, the subject database may be queried to extract all items with CVE mentions. Some vulnerabilities are mentioned in DW using Microsoft Security Bulletin Number (e.g., MS16-006) every bulletin number was mapped to its corresponding CVE ID, making ground truth assignment easy. These items can be both products sold on markets as well as posts extracted from forums discussing topics relating to malicious hacking. 378 unique CVE mentions were found between 2015 and 2016 from more than 120 DW websites. This number is a lot more than previous works have discovered (n=103). The posting date and descriptions associated with all the CVE mentions were also queried including product title and description, vendor information, entire discussion with the CVE mention, author of the posts, topic of the discussion.

Analyzing a sample of the DW items with CVE mentions, it was found that all items are posted with item names (a mandatory field for the majority of marketplaces) while only half of them are with description. The item names are mostly short (median number of words=7). Additionally, almost all of the items seem to advertise exploits—though in many cases it is implicit, and about 88.5% of these vulnerabilities are not reported by Symantec; although 16% of them target products run on Microsoft. The inventors chose not to label these samples as positives since there is no evidence supporting that these are functional exploits nor were used in the wild. From all items vulnerabilities, only 2% appeared in DW before reported by Symantec while 9.5% are either reported by Symantec without date (7% of the total items vulnerabilities) or with date before they appeared in DW (2.5%). This implies that early predicting what vulnerabilities will be exploited is a non-trivial task when only using events in the past when predicting future. Further discussions on more observations are presented below.

Attack Signatures (Ground truth). For our ground truth, vulnerabilities that were exploited in the wild were identified using Symantec's anti-virus attack signatures and Intrusion Detection Systems' (IDS) attacks signatures. The attack signatures were associated with the CVE-ID of the vulnerability that was exploited. These CVE's were mapped to the CVE's mined from NVD, EDB, ZDI and DW. This ground truth indicates actual exploits that were used in the wild and not just proof-of-concept exploits used as ground truth in related work. Table 1 shows the number of vulnerabilities exploited as compared to the ones disclosed in 2015 and 2016 for all the data sources considered. For NVD, around 2.4% of the disclosed vulnerabilities were exploited, which is consistent with previous literature. On the other hand for EDB, ZDI and DW there is a significant percent increase in exploited vulnerabilities to 9%, 12% and 14% respectively. This shows that it was more likely to identify a vulnerability that will be exploited in the future if it has a proof-of-concept available in EDB or mentions in ZDI or DW. For this research, there was no data regarding the volume and frequency of the attacks carried by exploits; hence all exploited vulnerabilities were considered to have equal importance and deserve the same amount of consideration. Additionally, the exploitation date of a vulnerability was defined as the date it was first detected in the wild. Symantec IDS attack signatures are reported without recoding the dates when they were first detected, but anti-virus attacks signatures are reported with their exploitation date. Within 2015 and 2016, the attack signatures reported without dates are 112 while those reported with their discovery dates are 194.

Figure 15:
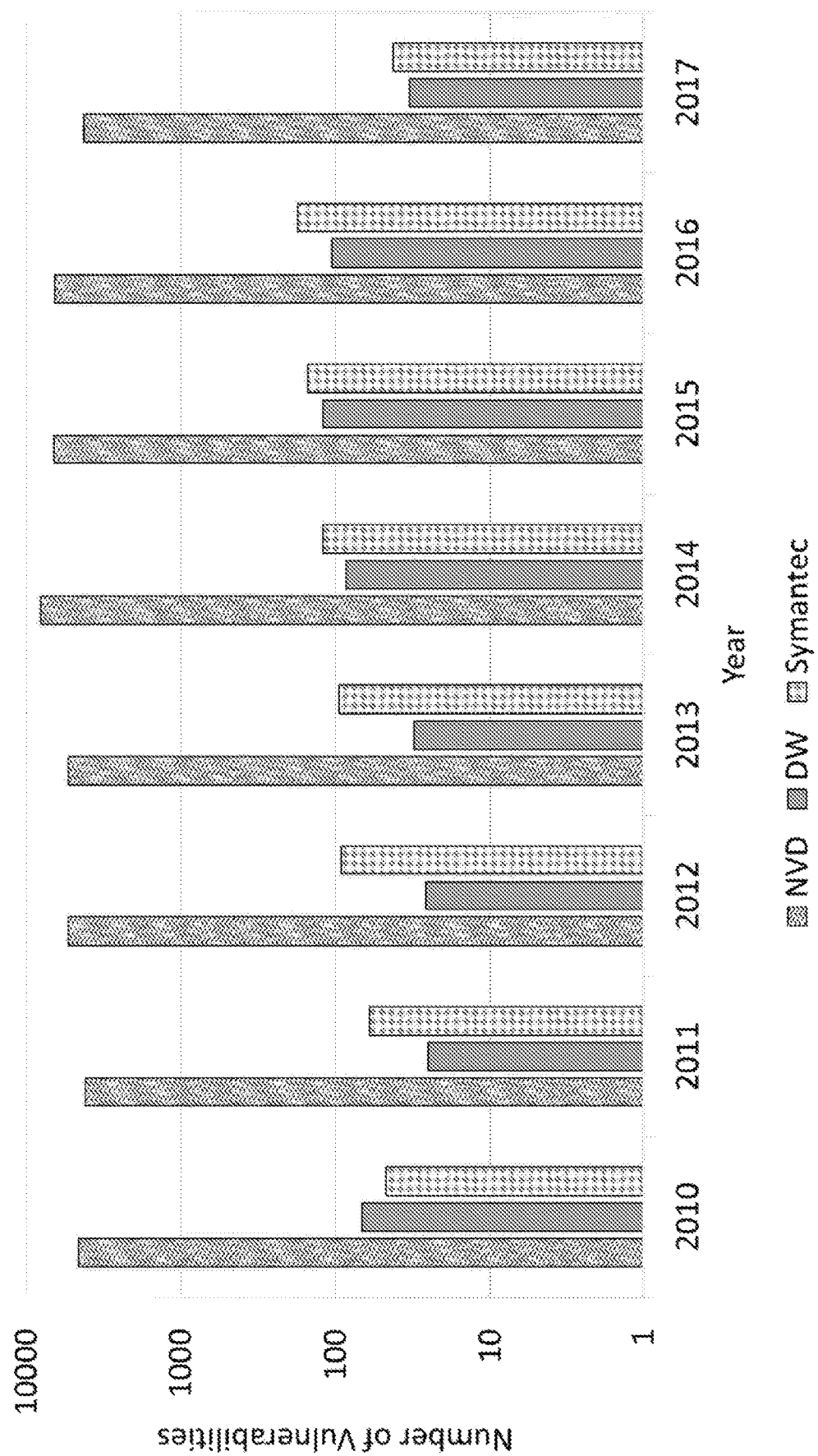
FIG. 15 is a histogram showing vulnerabilities represented per year from NVD, DW and Symantec, according to aspects of the present disclosure.

The second embodiment of the present disclosure (embodiment B) is evaluated on a database of 46 darkweb and deepweb forums collected from the same data collection infrastructure used by embodiment A. However, a longer time period of data is considered in embodiment B. All postings between January 2010 and March 2017 are analyzed or otherwise considered. FIG. 15 is a histogram showing the vulnerability reported per year from NVD, DW, and Symantec. Additionally, the same ground truth data is used to label exploited vulnerabilities.

Feature Description

Features used by embodiment A were combined from all the data sources 110 discussed herein. Table 2 gives a summary of the features with their type. Each of the features shall be discussed below.

TABLE 2

Summary of features.

| Feature | Type |
| --- | --- |
| NVD and DW description | TF-IDF on bag of words |
| CVSS | Numeric and Categorical |
| DW Language | Categorical |
| Presence of proof-of-concept | Binary |
| Vulnerability mention on ZDI | Binary |
| Vulnerability mention on DW | Binary |

NVD and DW description. NVD description provides information on the vulnerability and what it allows hackers to do when they exploit it. DW description often provides rich context on what the discussion is about (mostly in forums rather than marketplaces since items are described in fewer words). Patterns can be learned based on this textual content. The description of published vulnerabilities was obtained from NVD between 2015 and 2016. The inventors also queried the DW database for CVE mentions between 2015 and 2016. This description was appended to the NVD description with the corresponding CVE. It was observed that some of the descriptions on DW are in a foreign language as discussed herein. The foreign text was translated to English using Google Translate API. The text features were vectorized using term frequency-inverse document frequency (TF-IDF) model, which creates a vocabulary of all the words in the description. The importance of a word feature increase the more times it occurs but is normalized by the total number of words in the description. This eliminates common words from being important features. The TF-IDF model was limited to 1000 most frequent words (there was no benefit in the performance by using more word features, it just adds to the computational cost).

CVSS. NVD provides a CVSS score and the CVSS vector from which the score is computed indicating the severity of each of the disclosed vulnerability. CVSS version 2.0 was used as a feature for a classifier (numeric type) implemented with the described exploitation prediction model. The CVSS vector lists the components from which the score is computed. The components of the vector include Access Complexity, Authentication, Confidentiality, Integrity and Availability. Access complexity indicates how difficult is to exploit the vulnerability once the attacker has gained access. It is defined in terms of three levels: High, Medium and Low. Authentication indicates whether authentication is required by the attacker to exploit the vulnerability. It is a binary identifier taking the values Required and Not Required. Confidentiality, Integrity and Availability indicate what loss the system would incur if the vulnerability is exploited. It takes the values None, Partial and Complete. All the CVSS vector features are categorical. The inventors vectorized these features by building a vector with all possible categories. Then if that category is present we insert "1" otherwise "0".

Language. DW feeds are posted in different languages. Four languages were found that are used in DW posts referencing vulnerabilities. These languages are English, Chinese, Russian, and Swedish. Since the number of samples was limited from every language, the text translation was used as described. However, translation can result in a loss of important information, but the impact of knowing the language is retained by using it as feature. The analysis on the languages of DW fees are shown and their variation in the exploitation rate.

Presence of proof-of-concept. The presence of proof-of-concept exploits in EDB increases the likelihood of a vulnerability being exploited. It was treated as a binary feature indicating whether proof-of-concept is present for a vulnerability or not.

Vulnerability mention on ZDI. Vulnerability mention on ZDI also increases the likelihood of it being exploited. Similar to proof-of-concept exploit a binary feature was used to denote whether a vulnerability was mentioned (disclosed) in ZDI before it is exploited. Vulnerability mention on DW. Vulnerability mention on DW also increases the likelihood of it being exploited. Binary feature indicating vulnerability mention on DW is considered as a feature.

On the other hand, a subset of the mentioned features comprising NVD and DW description, CVSS base score, and the language of DW posts are also used in embodiment B. In addition to those features, two more sets of features may be added. Those features include: (1) Common Weakness Enumeration (CWE), and (2) a set of features computed from the social network structure of users posting in a forum. A summary of each of these two sets of features is provided below.

CWE. It is a community-effort project comprising enumerating common software security weaknesses (categorical). These are categories of flaws that can be made during the software development and can exist in the software architecture, design, or code.

DW Social Network Features. This set of features contains measures computed from the social connections of users posting hacking-related content. The basic social network features (e.g., in-degree, out-degree) indicates how active a user is in the social graph. More advanced features measure the centrality of users in the social graph. Highly central users are more important; thus the vulnerability mentions should take more consideration. The features were computed for the set of users who explicitly mentioned one or more CVE-IDs in their posts.

VULNERABILITY ANALYSIS

For vulnerabilities used for evaluating embodiment A, the likelihood that a given vulnerability mentioned in a data source 110 will be exploited is analyzed. Time-based analysis is then provided based on the dates the exploited CVE's were mentioned in the data sources, and the exploitation date found in Symantec data. This analysis shows us how many of the vulnerability mentions online preceded their exploitation date. As mentioned herein, the vulnerabilities that were reported by Symantec without the exploitation date are 112; while those reported with their exploitation dates are 194. All exploited vulnerabilities are used as ground truth for the first analysis (likelihood of exploitation). However, in the time-based analysis the exploited vulnerabilities without reported dates were ignored since it cannot make any assumptions if they were detected before or after the vulnerability disclosed. Furthermore, we analyze our ground truth and compare it with other sources to identify the highly vulnerable software and system vendors. Symantec reports attack signatures for vulnerabilities existing in certain products. The distribution of the affected vendors in every data source was studied to show the variation in vendor coverage attained from our data sources. This analysis was based on the vendor mentions by CPE data from NVD. A vulnerability can exist in variant software versions that run on different operating systems. Finally, a language-based analysis on the DW data was provided to shed light on some sociocultural factors present in darkweb and appear to have implications on the exploitability likelihood.

Likelihood of Exploitation. Before the likelihood of vulnerability mentions online is computed in the data sources 110 are exploited, it is important to understand the variability between these data sources 110 in covering exploited vulnerabilities. Higher variability between data sources 110 implies higher information gain and less redundancy. On the other hand, if an online mention of a vulnerability in a data source 110 does not increase the likelihood of being exploited as compared to NVD, the inclusion of that data source 110 adds no value to the prediction model. Table 3 shows the vulnerability exploitation probabilities for the vulnerabilities mentioned in a given data source 110. This analysis emphasizes the value of overt data sources 110 in supplementing NVD data. As mentioned herein, around 2.4% of the vulnerabilities disclosed in NVD are exploited in the wild. Hence, including other sources can increase the likelihood of correctly predicting the vulnerability that will be exploited.

Time-Based Analysis. Most software systems receive repeated attacks to vulnerabilities known in the system long time after an exploit has been detected in the wild. According to a recent empirical study on exploit data recorded by Symantec, more than half of the attacked software and systems received the same attacks repeatedly over more than two years. Vulnerability may take long time between the date they are disclosed to the date patch is deployed. To develop sound metrics that assesses the vulnerability importance i.e. detects vulnerabilities before they are exploited in real world attack, vulnerability mentions are considered that appear before the exploitation date, or a short-time after the exploitation date such that the vulnerability is still not patched by many system administrators. Here, only the population of exploited vulnerabilities that are reported are analyzed with their exploitation date (n=194).

Figure 3:
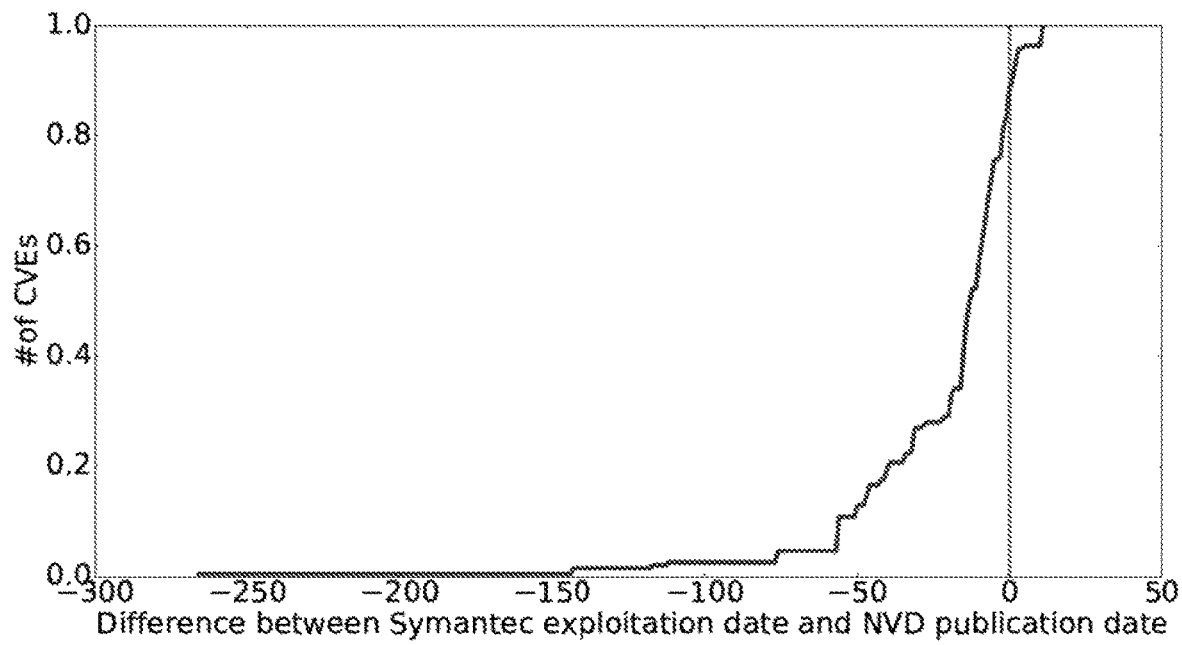
FIG. 3 is a graphical representation of the day difference between Common Vulnerabilities and Exposures (CVE) first published in the National Vulnerability Database (NVD) and Symantec attack signature date vs. the fraction of exploited CVE's on NVD reported, according to data examined by embodiment A and aspects of the present disclosure.

FIG. 3 shows that more than 90% of cases, vulnerabilities are disclosed by NIST before any real-world attack is detected. In the other few cases, the attacks were launched in the wild before NIST published the vulnerabilities. This phenomena is attributed to three reasons: 1) the vulnerability information is sometimes leaked before the disclosure, 2) by the time NIST disclosed a vulnerability in NVD, other sources have already validated and disclosed it, then exploits are rapidly used it in real-world attacks, or 3) the attacker knew that what they were doing was successful and continued to exploit their targets until discovered. Additionally, ZDI and NVD have limited variation on the vulnerability disclosure dates (median is 0 days). It is important to note that as ZDI disclosures come from industry, that reserved CVE numbers are shown earlier here than in other sources.

TABLE 3

Number of vulnerabilities exploited, the number of exploited vulnerabilities, the fraction of exploited vulnerabilities that appeared in each source, and the fraction of total vulnerabilities that appeared in each source. Results are reported for vulnerabilities and exploited vulnerabilities appeared in EDB, ZDI, DW (distinct CVEs), CVEs in ZDI or DW, and results for intersection of the three sources.

|  | EDB | ZDI | DW | ZDI v DW | EDB v ZDI v DW |
|---|---|---|---|---|---|
| Number of vulnerabilities | 799 | 824 | 378 | 1180 | 1791 |
| Number of exploited vulnerabilities | 74 | 95 | 52 | 140 | 164 |
| Percentage of exploited vulnerabilities | 21% | 31% | 17% | 46% | 54% |
| Percentage of total vulnerabilities | 6.3% | 6.5% | 3.0% | 9.3% | 14.2% |

Figure 4:
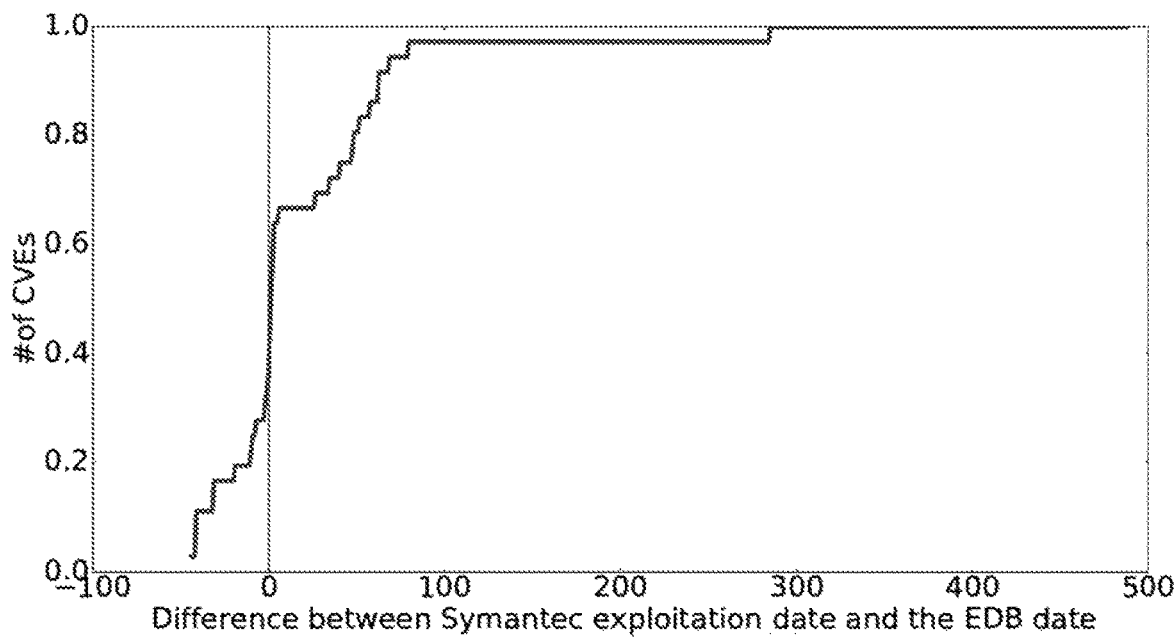
FIG. 4 is a graphical representation of a day difference between proof-of-concept CVE first mentioned and Symantec attack signature date vs. the fraction of exploited CVE's on ExploitDB (EDB) reported, according to data examined by embodiment A and aspects of the present disclosure.
Figure 5:
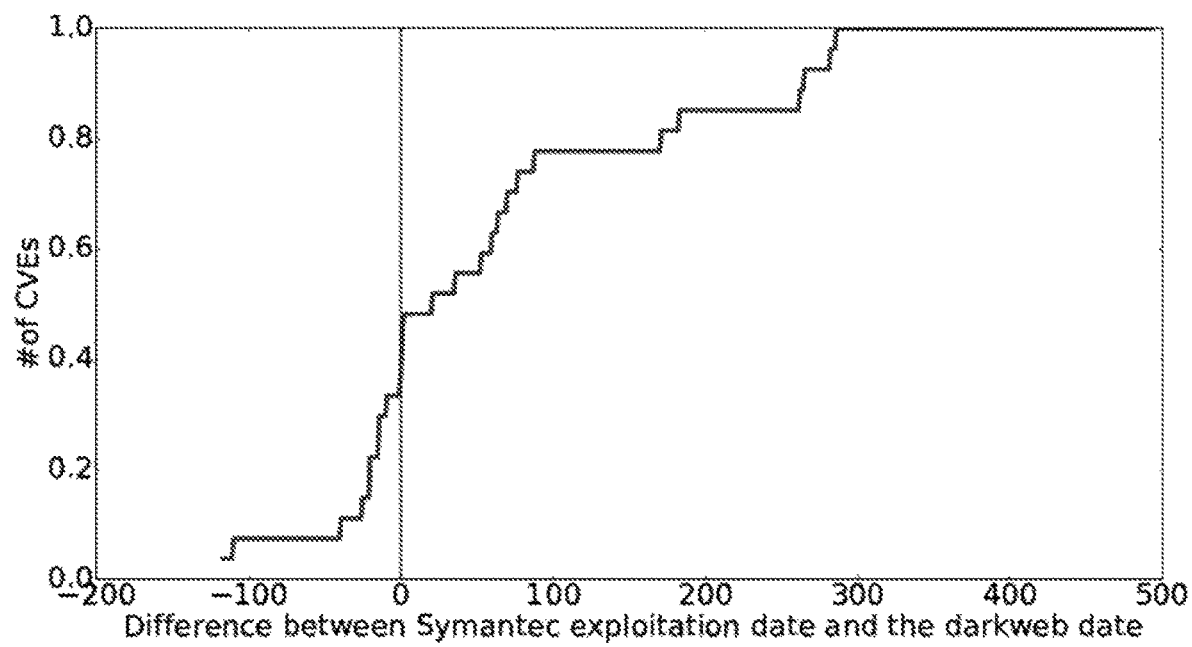
FIG. 5 is a graphical representation of the day difference between CVE first mentioned in darkweb and deepweb and Symantec attack signature date vs. the fraction of exploited CVE's on darkweb and deepweb reported, according to data examined by embodiment A and aspects of the present disclosure.

In case of EDB database, almost all of the exploited vulnerabilities (with exploitation date) from the vulnerabilities that have proof-of-concept exploits archived in EDB were found in the wild within the first 100 days of proof-of-concept availability. Such short time period between proof-of-concept availability and actual attack in the real-world indicates that having a template for vulnerability exploitation (in this case proof-of-concept) makes it easier to be deployed in real world attacks. FIG. 4 shows difference in days between the availability of proof-of-concepts exploits and exploitation date. In case of DW database, more than 60% of the first-time mentions to the exploited CVE's are within 100 days before or 100 after the exploitation dates. The remaining mentions are within the 18 month time frame after the vulnerability exploitation date (see FIG. 5).

Figure 6:
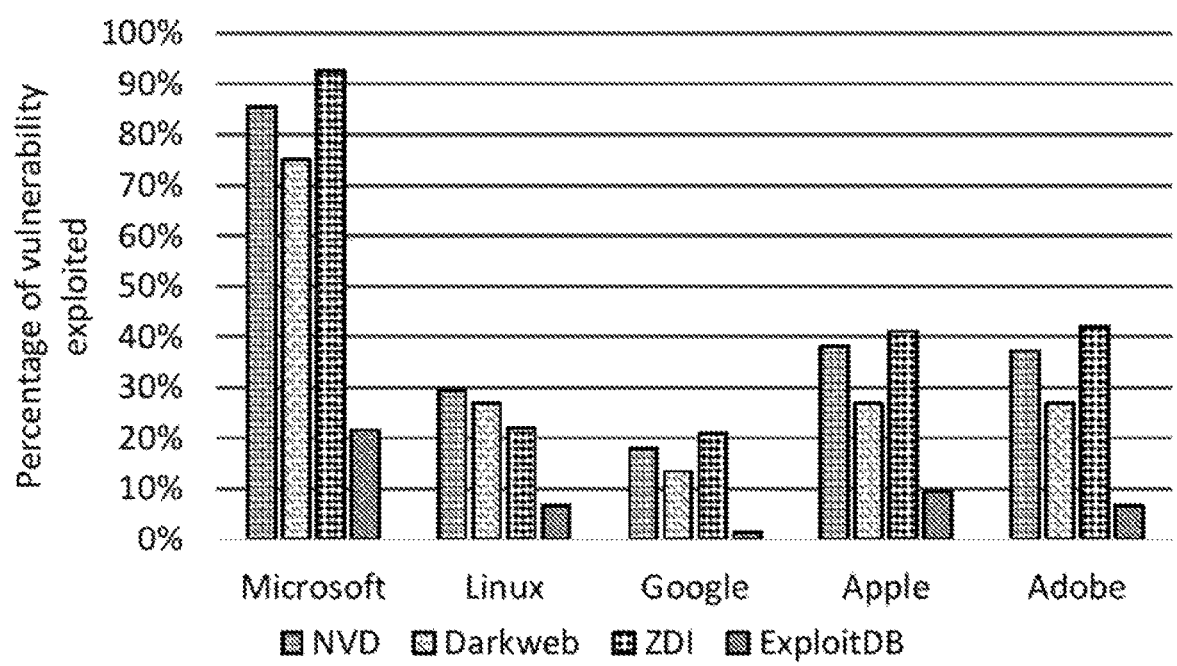
FIG. 6 is a graphical representation of the most exploited vendors, according to data examined by embodiment A and aspects of the present disclosure.

Vendor-Based Analysis. It is important to note that Symantec reports vulnerabilities that attack the systems and software configurations used by their customers. In the time period studied, more than 84% and 36% of the exploited vulnerabilities reported by Symantec exist in products solely from, or run on, Microsoft and Adobe's products, respectively; whereas less than 16% and 8% of vulnerabilities published in NVD are related to Microsoft and Adobe, receptively. FIG. 6 shows the percentage from the exploited vulnerabilities that can affect each of the top five vendors in every data source. It is important to note that a vulnerability may affect more than a vendor (e.g., CVE-2016-4272 exists in Adobe Flash Player, and it allows attackers to execute arbitrary code via unspecified vectors and can affect products from all five vendors). Additionally, the absence of vulnerabilities detected in other important systems and software vendors from Symantec's dataset does not imply that they have not been exploited; rather, they are not detected by Symantec (false positives). Furthermore, the presence of some operating systems vendors (e.g., Linux) in the exploited vulnerabilities does not necessarily imply good coverage of Symantec's data to these systems; however, other exploited products can run on these operating systems.

DW data appears to have more uniform vendor coverage. Only 30% and 6.2% of the vulnerabilities mentioned in DW during the time period are related to Microsoft and Adobe, receptively. Additionally, ZDI favors products from these two vendors (Microsoft is 57.8%, and Adobe 35.2%), as well as Apple's products (40.6%). This provides evidence that each data source covering vulnerabilities targeting varying sets of software vendors.

Figure 7:
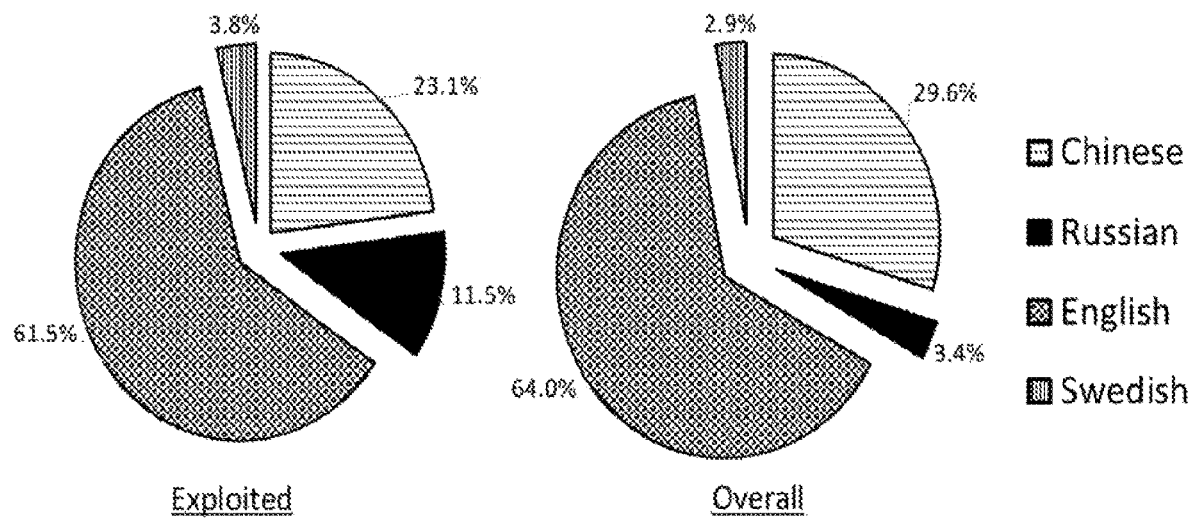
FIG. 7 is a graphical representation showing the percentage of vulnerabilities mentions in each language and the percentage of the exploited vulnerabilities mentioned in each language, according to data examined by embodiment A and aspects of the present disclosure.

Language-Based Analysis. The users posting in DW hacking forums, and the vendors selling in marketplaces, are found to be discussing technical details about disclosed vulnerabilities, and trading real-world exploits. Interestingly, it was found that notable variations on the exploitation likelihood conditioned on the language used in DW data feeds are referencing CVE's. In DW feeds, four languages are detected with different vulnerability posts and items distributions. FIG. 7 shows the percentage of vulnerability mentions and the fraction of exploited vulnerabilities given it is mentioned by each language. Expectedly, English and Chinese, have the highest numbers of vulnerabilities (n=242, and n=112, respectively). However, vulnerability posts in Chinese exhibit the lowest exploitation rate (about 10%) followed by English (about 13%). The other two languages are Russian and Swedish with few vulnerability mentions, but both exhibit very high exploitation rates. About 46% of the vulnerabilities mentioned in Russian where exploited (n=6), and about 19% for vulnerabilities mentioned in Swedish (n=2). Even though languages imply the likelihood of exploitation, they can be viewed as a double-edged sword since the language-dependent sets of textual features need considerable size of training corpus, and DW data feeds are insufficient for training classifiers for each language. As mentioned herein, the translation of the DW text is used after preprocessing (special character removal, stemming and bag of word) as well as the vulnerability description from NVD to train and test our model. This helps in capturing valuable textual features related to hacking and exploiting vulnerabilities, but other cultural-dependent features may go uncaptured. To account for any lose from the limitation of training samples, we use the DW mention languages as features.

EXPERIMENTAL SETUP (Embodiment A)

Three experiments were performed with the models to determine effectiveness in prediction of exploitability. First, the model was compared to a benchmark done under conditions very close to work previously presented. For present model, it was found that Random Forest (RF) gives us the best F1 measure. Random forest is an ensemble method proposed by Breiman. It is based on the idea of generating multiple predictors (decision trees in this case) which are then used in combination to classify a new disclosed vulnerability. The strength of the random forest lies in introducing randomness to build each classifier and using random low dimensional subspaces to classify the data at each node in a classifier. A random forest was used that combines bagging for each tree with random feature selection at each node to split the data. The final result is therefore an ensemble of decision trees each having their own independent opinion on class labels (exploited or not exploited) for a given disclosed vulnerability. A new vulnerability is classified independently by each tree and assigned a class label best fit for it. Multiple decision trees may result in having multiple class labels for the same data sample; hence, to take the final decision a majority vote is taken and the class label with most votes is assigned to the vulnerability.

Performance Evaluation (Embodiment A)

The classifiers were evaluated based on two classes of metrics that have been used in previous work. The first class is used to demonstrate the performance achieved on the minority class (in our case here 1.2%). The metrics under this class are precision and recall. They are computed as reported in Table 4. Precision is defined as the fraction of vulnerabilities that were exploited from all vulnerabilities predicted to be exploited by the present model. It highlights the effect of mistakenly flagging non-exploited vulnerabilities. Recall is defined as the fraction of correctly predicted exploited vulnerabilities from the total number of exploited vulnerabilities. It highlights the effect of unflagging important vulnerabilities that were used later in attacks. For highly imbalanced data, these metrics give an intuition regarding how well the classifier performed on the minority class (exploited Vulnerabilities). The F1 measure is the harmonic mean of precision and recall. It summarizes the precision and recall in a common metric. The F1 measure can be varied based on the trade-off between precision and recall. This trade-off is dependent on the priority of the applications. If keeping the number of incorrectly flagged vulnerabilities to a minimum is a priority, then high precision is desired. To keep the number of undetected vulnerabilities that are later exploited minimum, high recall is desired. We further report Receiver Operating Characteristics (ROC) curve as well as Area Under Curve (AUC) of the classifier, which is close to perfect (95%). ROC graphically illustrates the performance of our classifier by plotting the true positive rate (TPR) against the false positive rate (FPR) at various thresholds of the confidence scores the classifier outputs. In binary classification problems, the overall TPR is always equivalent to recall for the positive class while FPR is the number of not exploited vulnerabilities that are incorrectly classified as exploited from all not exploited samples. ROC is a curve; thus, AUC is the area under ROC. The higher, the better (i.e., a classifier with AUC=1 is a perfect classifier).

TABLE 4

Evaluation metrics.

| Metric | Formula |
| --- | --- |
| Precision | $\frac{TP}{TP + FP}$ |
| TPR (recall in case of binary classification) | $\frac{TP}{TP + FN}$ |
| F1 | $2 * \frac{precision * recall}{precision + recall}$ |
| FPR | $\frac{FP}{FP + TN}$ |

TP—true positives,
FP—false positives,
FN—false negatives,
TN—true negative.

Results (Embodiment A)

Benchmark Test. The present model was compared to recent works on using vulnerabilities mentioned on twitter to predict if such vulnerabilities would be exploited or not. They use Support Vector machine (SVM) as their classifier, the present model works best with Random Forest classifier. Although it would be straightforward to think that our approach would achieve better performance than previous work, this work is only compared because: (1) to the best of our knowledge, there is no existing work on predicting exploits in the wild using DW data, and (2) it is compared with all major approaches, and using feeds from social media currently is the best one. The inventors restrict the training and evaluation of their classifier to vulnerabilities targeting Microsoft and Adobe products as Symantec does not have attack signatures for all the targeted platforms. They perform a 10-fold stratified cross validation, where the data is partitioned into 10 parts while maintaining the class ratio in each part, they train on 9 parts and test on the remaining one. The experiment is repeated for all 10 parts. Hence, each sample gets tested at least once.

Figure 8:
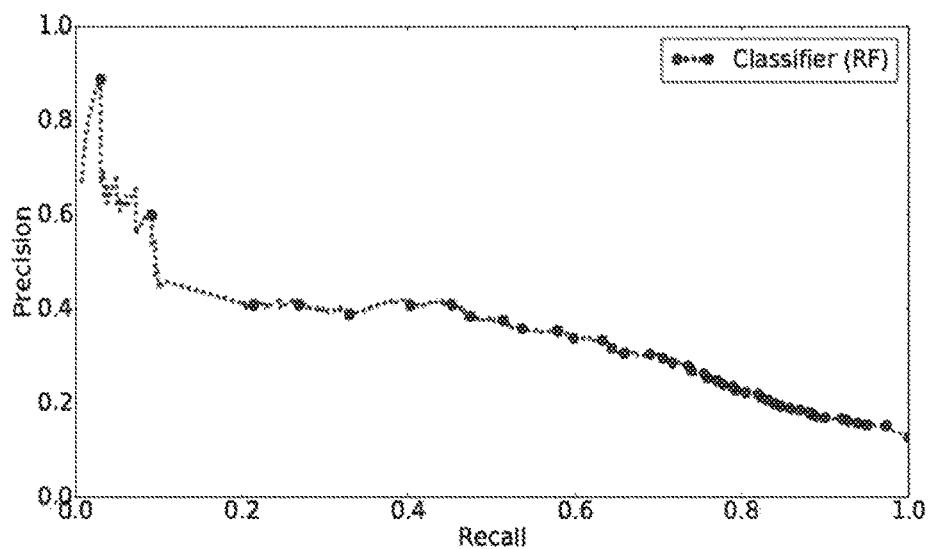
FIG. 8 is a graphical representation of a precision-recall curve for proposed features for Microsoft-Adobe vulnerabilities, according to data examined by embodiment A and aspects of the present disclosure.

For comparison, the same experiment is performed, under highly similar assumptions. Exploited vulnerabilities are all used regardless of whether the date is reported by Symantec or not. In the present case, 2056 vulnerabilities target Microsoft and Adobe products. Out of 2056 vulnerabilities, 261 are exploited, fraction that is consistent with previous work. A 10-fold stratified cross-validation is performed. The precision-recall curve is plotted for the present model (see FIG. 8). The precision-recall curve shows us the trade-off between precision and recall for different decision threshold. Since F1 measure is not reported, the precision-recall curve reported is used to draw comparison. By maintaining the recall value constant, how the precision varies are compared.

Table 5 shows the comparison between the two models by comparing precision for different values of recall. For a threshold of 0.5 we get an F1 measure of 0.44 with precision 0.53 and recall 0.3. Maintaining the recall, the precision displayed in the graph is 0.3 significantly lower than 0.4. The same experiment is performed on different recall values to compare the precision. At each point, higher precision is obtained than the previous approach.

TABLE 5

Precision comparison between * and proposed model while keeping the recall constant.

| Metric | Precision [44]* | Precision (This paper) |
| --- | --- | --- |
| Recall = 0.20 | 0.30 | 0.41 |
| Recall = 0.40 | 0.18 | 0.40 |
| Recall = 0.70 | 0.10 | 0.29 |

*Numbers derived from FIG. 6.a. from [44]

Avoiding temporal intermixing. It should be understood that the temporal sequencing of exploit warning could lead to future events being used to predict past ones. This could lead to inaccurate results, especially in the case where there is strong temporal dependencies in the data—which argues is the case for social media. In this experiment we sort the vulnerabilities according to their disclosed dates on NVD. The first 70% was reserved for training and the rest for testing.

Figure 9:
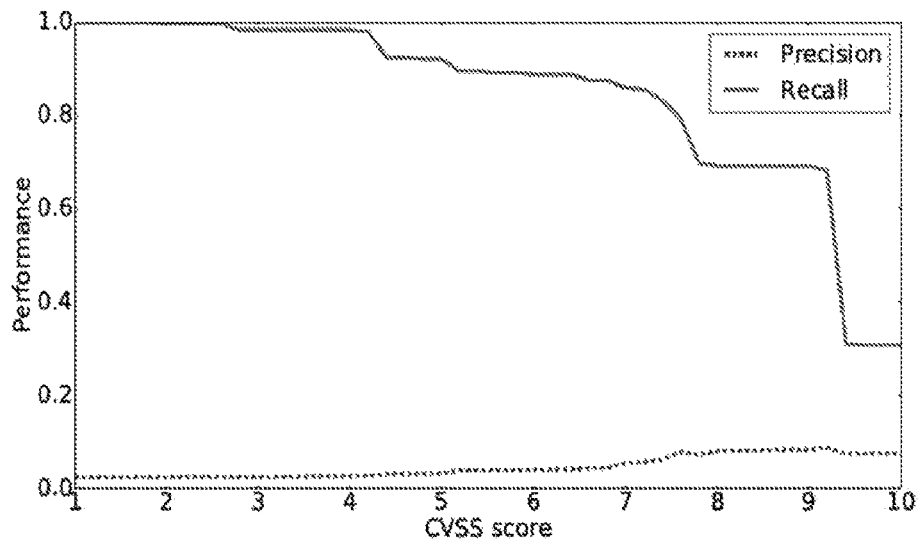
FIG. 9 is a graphical representation of a precision and recall for classification based on CVSS base score version 2.0 threshold, according to data examined by embodiment A and aspects of the present disclosure.

For a baseline comparison we use the CVSS version 2.0 score to classify whether a vulnerability will be exploited or not based on the severity score assigned to it. The CVSS score has been used as a baseline in previous studies. CVSS tends to classify on the side of caution i.e. it tends to predict more vulnerabilities that will be exploited resulting in false positives. FIG. 9 shows the precision-recall curve for the CVSS score. It is computed by varying the decision threshold that decides whether to predict a vulnerability as exploited or not. CVSS gives high recall with very low precision which is not desired for real-world exploit detection. The best F1 measure that could be obtained was 0.15. The experiment is now performed using our proposed model.

Figure 10:
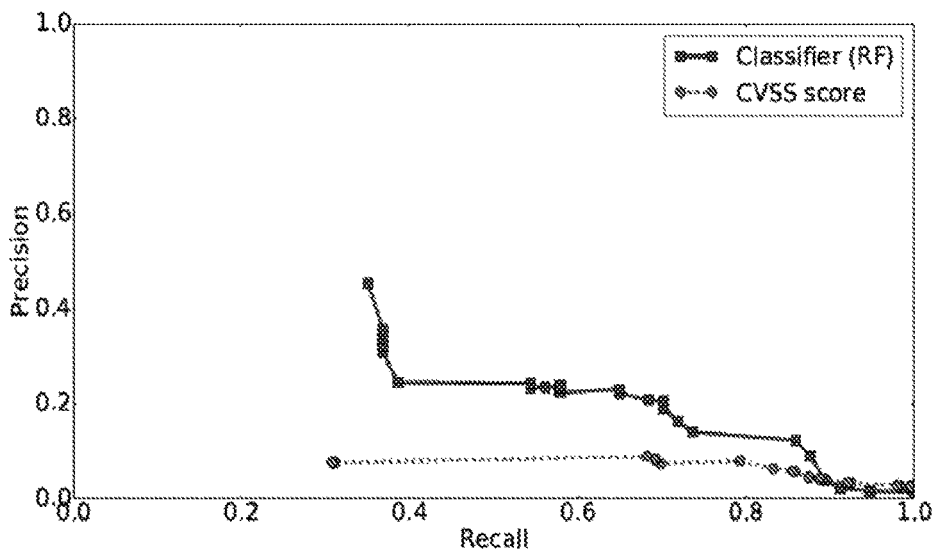
FIG. 10 is a graphical representation of a precision-recall curve for classification based on CVSS score threshold (RF), according to data examined by embodiment A and aspects of the present disclosure.

FIG. 10 shows the performance comparison between the proposed model using the random forest classifier and the CVSS score. The best F1 measure for the CVSS score is 0.15. The model outperforms the CVSS score with an F1 measure of 0.4 with precision 0.45 and recall 0.35.

Figure 11:
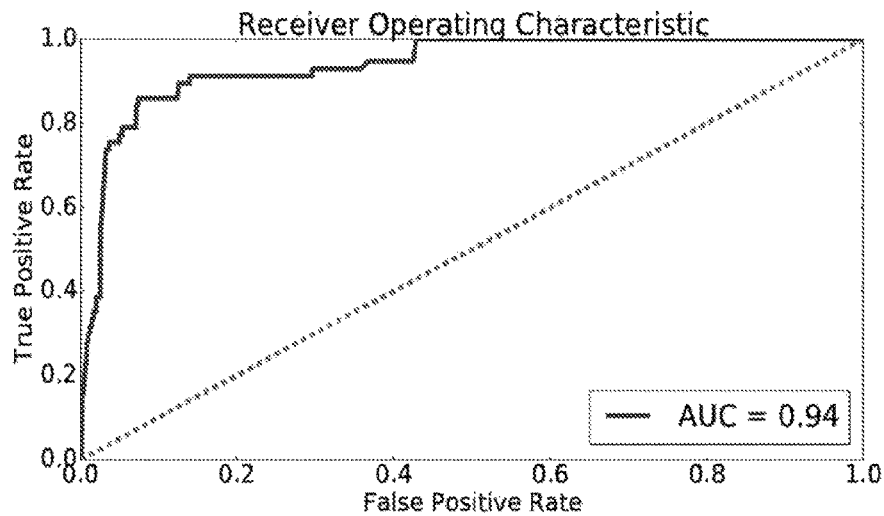
FIG. 11 is a graphical representation of a ROC curve for classification based on Random Forest classifier, according to data examined by embodiment A and aspects of the present disclosure.

The performance on the minority class is promising when realizing that the class imbalance is very severe and the ground truth is not perfect. The random forest classifier is able to score an average of F1 of 0.89 for 10 runs of randomly under-sampled training and testing datasets. However, this is not considered to reflect the actual performance for real-world deployment. Additionally, our classifier show very high TPR (90%) at low FPR (13%) and AUC of 95% as depicted in FIG. 11. This is comparable to previous work in predicting cyber threats, though in different prediction tasks, (TPR: 90%, and FPR: 10%), results reported in [49](TPR: 66%, and FPR: 17%), as well as reported results in [31](TPR: 70%, and FPR: 35%).

Evaluation with Individual Data Sources. What this effect does was studied introducing each data source has on the prediction of vulnerabilities mentioned in that source. This is an important to see if adding a particular data source benefits the vulnerabilities that have been mentioned in that data source. It was found that time based split used in the previous experiment leaves very few vulnerabilities mentioned in these data sources in the test set (ZDI: 18, DW: 4, EDB: 2). Hence the increase the numbers by (1) performing a 10-fold cross validation without sorting the vulnerabilities (2) the ground truth was increased by considering the exploited vulnerabilities that did not have exploit date (these were removed from earlier experiments since it was not clear whether these were exploited before or after the vulnerability was exploited). Using these two techniques, we have 84 vulnerabilities mentioned in ZDI that have been exploited, 57 in EDB, and 32 in DW. The results (precision, recall and F1) were reported for the vulnerabilities mentioned in each data source. Also, the prediction of these vulnerabilities was mentioned by using only NVD features. For the vulnerabilities mentioned in DW, DW features were only considered along with NVD, The model predicts 12 vulnerabilities as exploited with a precision of 0.67 and recall of 0.375. By only considering the NVD features, predicts 12 vulnerabilities as exploited with a precision of 0.23 and recall of 0.38. Hence using the DW features, the precision improved significantly from 0.23 to 0.67. Table 6 shows the precision-recall with corresponding F1 measure. DW information was thus able to correctly identify the positive sample mentioned in DW with higher precision.

TABLE 6

Precision, Recall, F1 measure for vulnerabilities mentioned on DW, ZDI, and EDB.

| Source | Case | Precision | Recall | F1 measure |
|---|---|---|---|---|
| DW | NVD | 0.23 | 0.38 | 0.27 |
|  | NVD + DW | 0.67 | 0.375 | 0.48 |
| ZDI | NVD | 0.16 | 0.54 | 0.25 |
|  | NVD + ZDI | 0.49 | 0.24 | 0.32 |
| EDB | NVD | 0.15 | 0.56 | 0.24 |
|  | NVD + EDB | 0.31 | 0.40 | 0.35 |

For ZDI, 84 vulnerabilities were mentioned in it. By just utilizing NVD features, we get an F1 measure of 0.25 (precision: 0.16, recall: 0.54) as compared to addition of ZDI feature with F1 measure of 0.32 (precision: 0.49, recall: 0.24), a significant improvement in precision. Table 6 also shows the precision-recall with corresponding F1 measure for samples mentioned on ZDI.

A similar analysis was performed for the vulnerabilities that have proof-of-concept available on EDB. For EDB we have 57 vulnerabilities with proof-of-concept. By just utilizing NVD features an F1 measure of 0.24 (precision: 0.15, recall: 0.56) was obtained as compared to addition of EDB feature with F1 measure of 0.35 (precision: 0.31, recall: 0.40), a significant improvement in precision as shown in Table 6.

Feature Importance. To better explain the choices to the features that were examined and provide an understanding on where the prediction power most attributed to, the features that have the most contribution to the prediction performance were reported. A feature vector for a sample has 28 features computed from the non-textual data (summarized in Table 2) as well as the textual features—TF-IDF computed from the bag of words for the 1000 words that have the highest frequency in NVD description and DW. For each of the features, the Mutual Information (MI) was computed, which computes how much a variable (here a feature $x_i$) tells about another variable (here the class label $y \in$ {exploited, not exploited}). The features that contribute the most from the non-textual data are {language_Russian=true, has_DW=true, has_PoC=false}. In addition, the features that contribute the most from the textual data are the words {demonstrate, launch, network, xen, zdi, binary, attempt}. All of these features received MI scores over 0.02.

ADVERSARIAL DATA MANIPULATION
(embodiment A)

The effects of adversarial data manipulation on DW data were studied. For EDB, we only consider vulnerabilities that have verified proof-of-concepts. ZDI also publishes only verified vulnerabilities; hence there is a very small chance of manipulating these data sources. On the other hand, the public nature of DW marketplaces and forums gives an adversary the ability to poison the data used by the classifier. They can achieve it by adding vulnerability discussions on these platforms with the intent of deceiving the classifier to predict exploitation by that vulnerability and having high false positives. Previous work discusses how an adversary can influence a classifier by manipulating the training data.

Figure 12A:
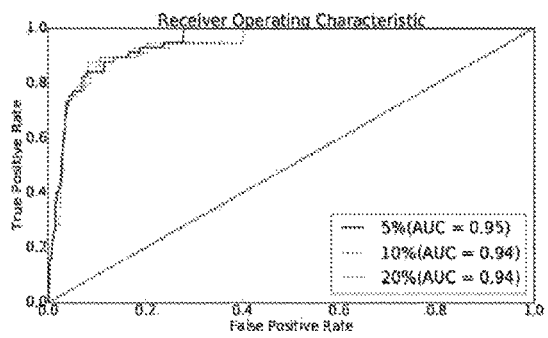
FIGS. 12A and 12B are graphical representations of an ROC curve using strategy 1 and strategy 2, respectively, according to data examined by embodiment A and aspects of the present disclosure.
Figure 12A:
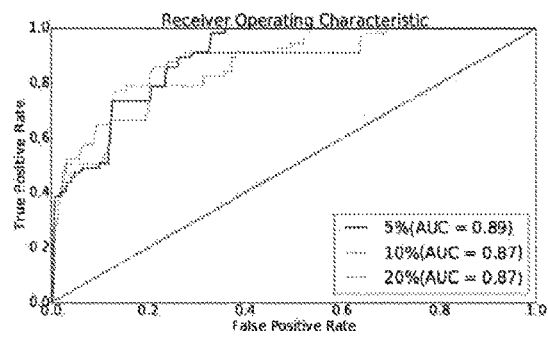

In the present prediction model, we use the presence of the vulnerability in darkweb, language of the market/forum it was mentioned and the vulnerability description as features. An adversary could easily post discussions regarding vulnerabilities he does not intent or has information that they will not be exploited. To study the influence of such noise on the performance of the model was conducted in two strategies:

1. Adversary adding random vulnerability discussion. In this strategy, the adversary initiates random vulnerability discussions on DW and reposts them with a different CVE number. So the CVE mentions on DW increases. For the present experiment, two cases were considered with different amounts of noise added. In case (1), it is assumed that the noise is present in both training and testing data. Varying fractions of noise (5%, 10%, 20% of the total data samples) randomly distributed in training and testing data were considered. The experimental setup follows conditions discussed herein. Vulnerabilities are first sorted according to time, and the first 70% are reserved for training and the remaining for testing. FIG. 12A shows the ROC curve showing the false positive rate (FPR) vs the true positive rate (TPR). For different amount of noise introduced, the present model still maintains a high TPR with low FPR and AUC≥0.94, a performance similar to the experiment without adding noise. This shows that the model is highly robust against noise such that it learns good representation of the noise in the training dataset then can distinguish them in the testing dataset.

For case (2), we randomly add vulnerability discussion found on DW with different CVE number to only the test data and repeat the same experiment. FIG. 12A shows the ROC plot. In the case, even though there is a slight increase in the FPR, the performance is still on par with the experiment without noise (AUC 0.87). Hence, noisy sample affect the prediction model slightly, if no noise was introduced in the training data.

Figure 12B:
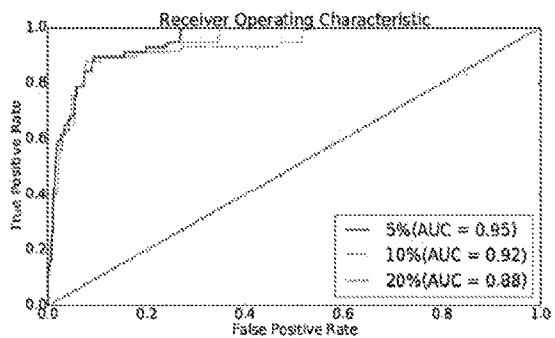
Figure 12B:
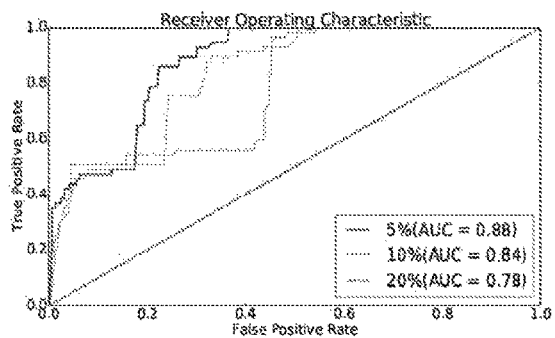

2. Adversary adding vulnerability discussion similar to NVD. In the previous strategy, the adversary was adding vulnerability discussions randomly without taking into account the actual capability of the vulnerability. For instance, CVE-2016-3350 is a vulnerability in Microsoft Edge as reported by NVD. If the vulnerability is mentioned on DW as noise by an adversary but targeting Google Chrome, then it might be easy for the prediction model to detect it as seen in previous experiments. But, what if the adversary crafts the vulnerability discussion such that it is a copy of the NVD description or consistent with the NVD description? In this strategy, the adversary posts the NVD description with the CVE number on DW. For case (1), this noise is considered to be randomly distributed in both training and testing. FIG. 12(b) shows the ROC curves for different levels of noise. The performance decreases as the number of noisy samples increases, but there is no significant decline (AUC 0.88).

The experiment was repeated with adding noise only in the test data for case (2). In this experiment the most performance was observed with AUC of 0.78 for 20% noise (see FIG. 12B). This shows that adding correct vulnerability discussions does affect the prediction model but with large number of such samples. Also, effect can be countered by adding such noisy samples in the training data as well for the model to learn from.

An important point to consider is an adversary would need to add a large number of noisy samples to drive down the performance of the prediction model. Previous research on using data feeds like Twitter for exploit prediction mention that an adversary can purchase large number of twitter accounts and flood twitter with vulnerability mentions. In DW markets and forums, creation of accounts needs verification and in some cases demonstration of skills to get in. While fake accounts are often themselves sold on the darkweb, it is difficult to purchase and maintain thousands of such fake accounts to post in them. Also, if one person is posting a large volume of discussions with CVE mentions, he/she can be identified from their username or can be removed from the market/forum if many of their posts get down voted as being not relevant. It is also important to note that such forums also function as a meritocracy—where users who contribute more are held in higher regard (which also makes it difficult to flood discussions with such information).

DISCUSSION (Embodiment A)

Viability of the Model and Cost of Misclassification The performance achieved by the model as a first-line defense layer is very promising. Recall that random forest classifier outputs a confidence score for every testing sample. A threshold can be set to identify the decision boundary. It should be noted that all the results reported in this disclosure are achieved based on hard-cut thresholds such that all samples that are assigned confidence score greater than a threshold thr are predicted as exploited. Blindly relying on a hard-cut threshold may not be a good practice in real-world exploits prediction; rather, thr should be varied in accordance to other variables within the organization such that different thresholds can be set to different vendors (i.e., $thr_{ven1}$, $thr_{ven2}$), or information systems (i.e., $thr_{sys1}$, $thr_{sys2}$). For instance, if an organization hosts an important website on an Apache server, and the availability of that site is of the top priority for that organization, then any vulnerability in Apache server should receive high attention and put forward to remediation plan regardless of other measures. Other vulnerabilities, tens of which are disclosed in daily bases, may exist in many other systems within the organization. Since it is very expensive to be responsive to that many security advisories (e.g., some patches may be unavailable, some systems may need to be taken offline to apply patches), exploitation assessment measures can help in quantifying the risk and planning mitigations. Risk is always thought of as a function of likelihood (exploitation)' and impact. The cost of classifying negative samples as exploited is the effort made to have it fixed. This mostly involves patching, or other remediation such as controlling access or blocking network ports. Similarly, the cost of misclassification depends on the impact incurs. For example, if two companies run the same database management system s, and one hosts a database with data about all business transactions for that company while the other host a database with data of that is of little value to the company, then the resulting cost of a data breach is significantly different.

Model Success and Failure Cases. By analyzing the false negatives and false positives, an understanding is gained as to why and where our model performs well as well as why and where it suffers. The 10 exploited vulnerabilities (about 18% of the exploited samples in the testing dataset) that received the lowest confidence scores seem to have common features. For example 9 of these 10 exist in products from Adobe, namely Flash Player (5 vulnerabilities) and Acrobat Reader (4 vulnerabilities). Flash Player's vulnerabilities look to have very similar description from NVD, and the same thing is observed for Acrobat Reader's product. It was also observed that they were assigned CVE-IDs at the same date (Apr. 27, 2016), and 7 out of these 9 were published at the same data as well (Jul. 12, 2016), and assigned a CVSS base score=10 (except for one, which is 7). The other vulnerability exist in Windows Azure Active Directory (CVSS score=4.3). Out of these 10 vulnerabilities, only one had a verified PoC archived on EDB before it was detected in the wild, and another one had a ZDI mention, while none was mentioned in DW. Misclassifying these vulnerabilities are attributed to the limited representation of these samples in the training data set. This observation signifies the importance of avoiding experiments on time-intermixed data, a point discussed herein.

The false positive samples were looked into that receive high confidence—samples where the model predicted as exploited while they are not. For the random forest classifier, with F1=0.4, all the false positives (about 40 out of about 3600 vulnerabilities) exist in products from Microsoft although the model does not use the vendor as feature. The model seems to be able to infer the vendor from other textual features. The inventors posit that this level of overfitting is unavoidable and marginal, and attribute this largely to the limitations on the ground truth. Though the model is highly generalizable, examples of vulnerabilities were found from other vendors with confidence scores close to thr that was set; however, it cannot be assumed that they are exploited.

Hacker Social Network (Embodiment B)

Embodiment B of present disclosure, adopts the same assumption made in much of the current literature related to DW data, in which that the same usernames (case insensitive) across different DW sites is assumed to belong to the same person(s). This assumption allows for generating one network comprising a large number of DW sites as opposed to a social network for each site.

Users' Social Graph. Formally, the users' social graph G=(V,E) is a weighted, directed graph with no self-loops (i.e., every edge has a weight; every edge points away from one node to another node; there exists at most one edge between any pair of nodes). V is the set of vertices (DW users) and E is the set of edges.

Then, an edge is created (with weight=1) from user $v_i$ to $v_j$ and labeled with the date of $v_i$'s posting date only if: (1) $v_i \square v_j$, (2) both $v_i$ and $v_j$ have posts in $I_x$, and $v_i$ has posted after $v_j$, (3) the number of posts between $v_i$'s post and $v_j$'s post in $I_x$ is less than thr (it is set to be 10 in all experiments in this disclosure), and (4) there is no existing edge originating from $v_i$ to $v_j$ and labeled with the same date. Once the edges are created, they are added to a multi-directed graph with parallel edges of weights=1. The multi-graph is then transformed to a directed graph G by summing the weights of the parallel edges pointing at the same direction.

Social Network Measures (Embodiment B)

After creating the social network, measures are computed derived from the network structure. In this disclosure, three categories of social network measures are considered:

Network Structure Measures: the measures under this category are: (1) In-degree: the number of edges pointing to the user, (2) Out-degree: the number of edges originated from the user, (3) Sum of In-degree weights: the sum of the weights for all edges pointing to the user, (4) Sum of out-degree weights: the sum of the weights for all edges pointing away from the user. These measures describe the type of activities in which the user engages. For example, higher in-degree than out-degree may indicate the user tendency towards creating new topics or posting under topics short time after they are created.

Centrality Measures: three measures are computed: (1) In-degree centrality: it measures the popularity of a user $v_i$ by normalizing $v_i$'s in-degree by the maximum possible in-degree, (2) Out-degree centrality: measures how actively a user $v_i$ replies to others by normalizing $v_i$'s out-degree measure by the maximum possible out-degree, (3) Betweenness centrality: for a user $v_i$, Betweenness centrality measures the importance of $v_i$ by computing the fraction of shortest paths between all pairs of users that pass through $v_i$.

Importance Measures: the number of connections user $v_i$ has with other users, by itself, may not be indicative of importance; rather, $v_i$ is important if his/her posts make other important users reply. Hence, influence metrics incorporate the centrality of users with outgoing edges to $v_i$ into Ids centrality (i.e., if an important user $v_j$ replies to $v_i$, then the importance of $v_i$ increases). Two measures are computed under this category: (1) Eigenvector centrality: measures the importance of $v_i$ by assigning a centrality proportional to the sum of in-neighbors' centralities. Eigenvector centrality of $v_i$ is the $i^{th}$ value of the eigenvector $C_e$ corresponding to the largest eigenvalue of the network adjacency matrix $A'$, and (2) Pagerank centrality: measures the centrality of $v_i$ by incorporating fractions of the centralities of in-neighbors, such that each of $v_i$'s in-neighbors passes the value of his/her centrality divided by the number of outgoing edges.

EXPERIMENTAL SETUP (Embodiment B)

In the present embodiment, only the vulnerabilities mentioned on the considered DW forums are considered. Additionally, the same experimental setup as used in embodiment A is used to examine the present embodiment. However, two additional steps are taken here; (1) the vulnerabilities that were mentioned by users with no communication history are removed, and (2) in each of the experiments, reported an average performance of five runs. The resultant dataset contains 157 distinct vulnerabilities, 24 of which have the class label exploited. Additionally, embodiment B of the present disclosure is evaluated on the exact same performance metrics as in embodiment A.

Results (Embodiment B)

Experiments under Real-World Conditions. In this set of experiments, the vulnerabilities were sorted by their DW date, then we train our classifiers on the vulnerabilities mentioned before June 2016 (125 vulnerabilities), and test on the vulnerabilities from June 2016 to March 2017 (32 vulnerabilities, only 3 are exploited. The classification performance achieved by our RF model has an average precision of 0.57, recall of 0.93, and F1 of 0.67. The same classifier is able to achieve on average AUC of 0.95. We note that the results of 5 runs show relatively high variance due to the small number of samples on which the models are tested. The lower score of precision is attributed to the fact that Symantec's data is biased towards reporting exploits targeting vulnerabilities that exist in software products from certain software vendors as discussed earlier. Since our model is found to predict vulnerabilities as being exploited from other vendors as well, we believe that some false positives were actually exploited in the wild but never detected by Symantec.

Ablation Test and Cross-Validation. Since the number of vulnerabilities in the testing dataset in the previous experiment is relatively small, stratified 5-fold cross-validation was applied on the whole dataset. In this experiment, the samples are intermixed; hence these conditions do not reflect the conditions of real-world streaming prediction (i.e., predicting the likelihood of exploitation at the time of the vulnerability mention). The average F1 achieved is 0.72, with a precision of 0.61, a recall of 0.89, and an AUC of 0.88.

Figure 16:
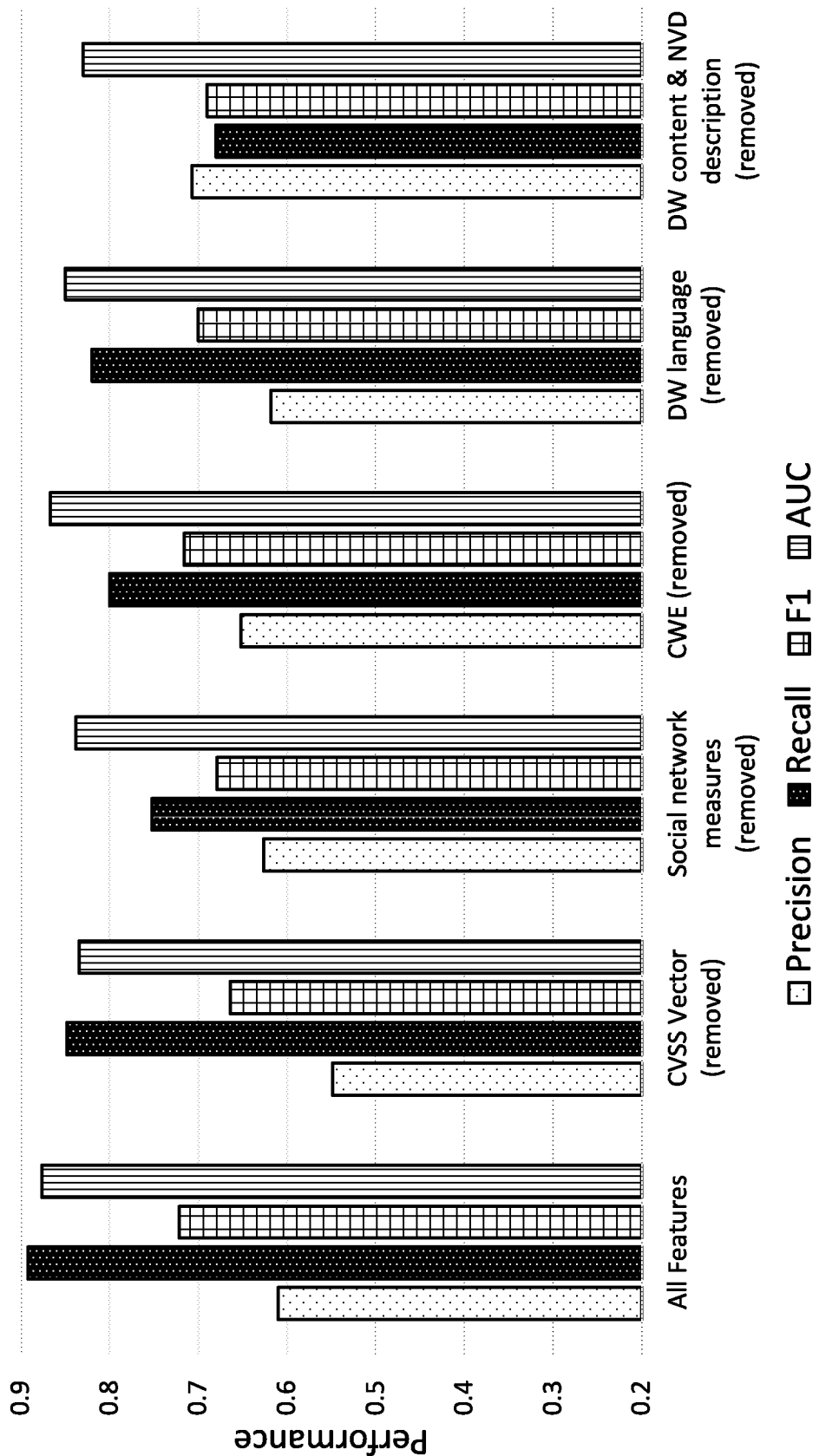
FIG. 16 is a graphical representation showing an ablation test, according to aspects of the present disclosure.
Figure 17:
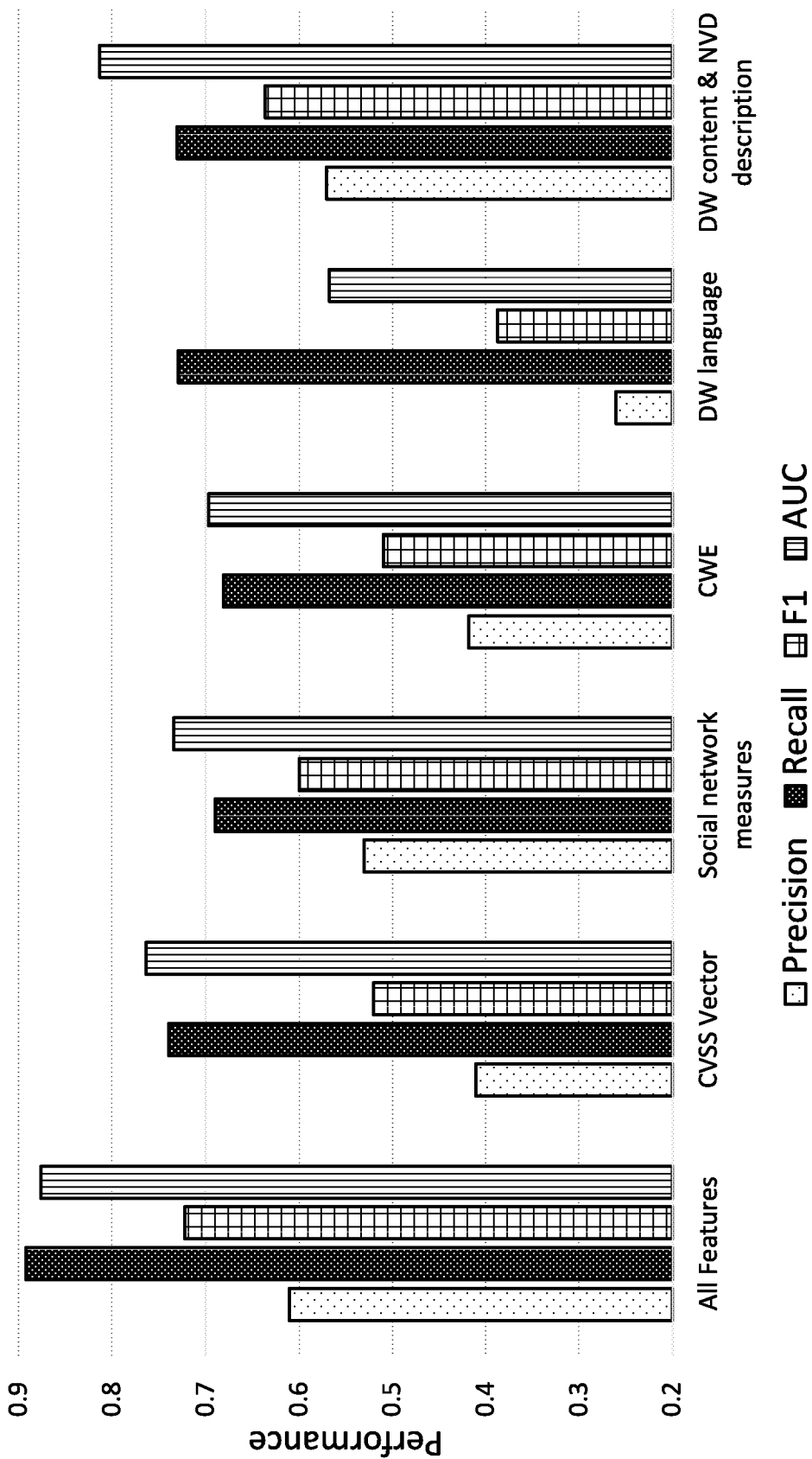
FIG. 17 is a graphical representation showing test results on individual feature sets, according to aspects of the present disclosure.

To measure the impact of individual feature sets on the overall classification performance, two tests were applied: (1) an ablation test (depicted in FIG. 16) where the change in precision, recall, F1, and AUC is recorded when each set of features is removed from the prediction model, and (2) a test on individual feature sets (depicted in FIG. 17) where the classification performance is reported for models trained on only one set features at a time. In the ablation test, when the set of social network features were removed from the model, some decrease in performance was recorded as depicted in FIG. 16. In the individual feature tests, the social network measures resulted in an improvement in performance that is significantly higher than the improvement recorded from the inclusion of other feature sets. It was noted that the simple classifier, which labels all vulnerabilities as being exploited, results in a precision of 0.16, a recall of 1, at an F1 of 0.27 and an AUC of 0.5.

CONCLUSION

A study of aggregating early signs from online vulnerability mentions was conducted for predicting whether a particular disclosed vulnerability will be exploited. The present prediction model is robust and useful as compared against previously introduced models that combine information from social media sites like twitter for exploit prediction. The results show that while maintaining recall significantly high precision was achieved in predicting exploits.

PERFORMANCE

The performance of several standard supervised machine learning approaches was compared for exploit prediction models examined in the first embodiment. Parameters for all approaches, were set in a manner to provide the best performance. The scikit-learn Python package was used. Other approaches for comparison will now be discussed.

Supervised Learning Approaches

Support Vector Machine (SVM). Support vector machine (SVM) was proposed by Vapnik. SVM works by finding a separating margin that maximizes the geometric distance between classes (in the instant case, exploited and not exploited). The separating margin is termed as hyperplane. When a separating plane cannot be found to distinguish between the two classes, the SVM cost function includes a regularization penalty and a slack variable for the misclassified samples. Varying these parameters, trade-off between precision and recall can be observed.

Naive Bayes Classifier (NB). Naive Bayes is a probabilistic classifier which uses Bayes theorem with independent attribute assumption. During training we compute the conditional probabilities of a sample of a given class having a certain attribute. The prior probabilities for each class i.e. fraction of the training data belonging to each class was computed. Naive Bayes assumes that the attributes are statistically independent hence the likelihood for a sample S represented with a set of attributes a associated with a class c is given as, $Pr(c|S)=P(c) \times \pi_{i=1}^{d} Pr(a_i|c)$.

Bayesian Network (BN). BN is a generalized form of NB such that not all features are assumed to be independent. Rather, variable dependencies are modeled in a graph leaned from the training data.

Decision Tree (DT). Decision tree is a hierarchical recursive partitioning algorithm. We build the decision tree by finding the best split attribute i.e. the attribute that maximizes the information gain at each split of a node. In order to avoid over-fitting, the terminating criteria is set to less than 5% of total samples.

Logistic Regression (LOG-REG). Logistic regression classifies samples by computing the odds ratio. The odds ratio gives the strength of association between the attributes and the class.

Results

The temporal information for all the classifiers was maintained. The disclosed vulnerabilities were sorted according to the time they were posted on NVD. The first 70% was reserved for training and the remaining for testing.

TABLE 7

Precision, Recall, F1 measure for RF, SVM, LOG-REG, DT and NB for predicting whether a vulnerability will be exploited or not.

| Classifier | Precision | Recall | F1 measure |
| --- | --- | --- | --- |
| RF | 0.45 | 0.35 | 0.40 |
| BN | 0.31 | 0.38 | 0.34 |
| SVM | 0.28 | 0.42 | 0.34 |
| LOG-REG | 0.28 | 0.4 | 0.33 |
| DT | 0.25 | 8.24 | 0.25 |
| NB | 0.17 | 0.76 | 0.27 |

Table 7 shows the comparison between the classifiers with respect to precision, recall and F1 measure. Random forest (RF) performs the best with F1 measure of 0.4 as compared to SVM: 0.34, BN: 0.34, LOG-REG: 0.33, DT: 0.25, and NB: 0.27. An interesting point to note, even though RF has the best F1 measure it does not have the best recall, NB does. RF was chosen as having high precision makes the model reliable as compared to low precision which results in a lot of false positives. The approach going forward that might improve recall without significantly affecting precision is to use an ensemble of different classifiers, where one approach helps the other approach to make the right decision. This way the strength of different classifiers can be combined and avoid their weaknesses.

Addressing Class Imbalance

The problem of class imbalance has gained lot researchers' attention because it exists in many real-world applications. This has resulted in large number of proposed approaches. Since our dataset is highly imbalanced (the percentage of minority class is only 1.2%), SMOTE is used to measure the improvement in classification performance. SMOTE over-samples the exploited vulnerabilities by creating synthetic samples with features similar to the exploited vulnerabilities. This data manipulating is only applied to the training set. Applying SMOTE, no performance improvement is achieved for our RF classifier. However, SMOTE introduces a considerable improvement with Bayesian Network (BN) classifier. Table 8 reports different over-sampling sizes and the change in performance. Over exaggerating in creating synthetic positive samples can overpower the real samples leading to reduction in the model performance.

TABLE 8

Performance improvement attained by applying SMOTE for BN classifier using different over-sampling percentages for the exploited samples

| Over-Sampling Percentages | Precision | Recall | F1 measure |
| --- | --- | --- | --- |
| 100% | 0.37 | 0.42 | 0.39 |
| 200% | 0.40 | 0.44 | 0.42 |
| 300% | 0.41 | 0.40 | 0.40 |
| 400% | 0.31 | 0.40 | 0.35 |

Figure 18:
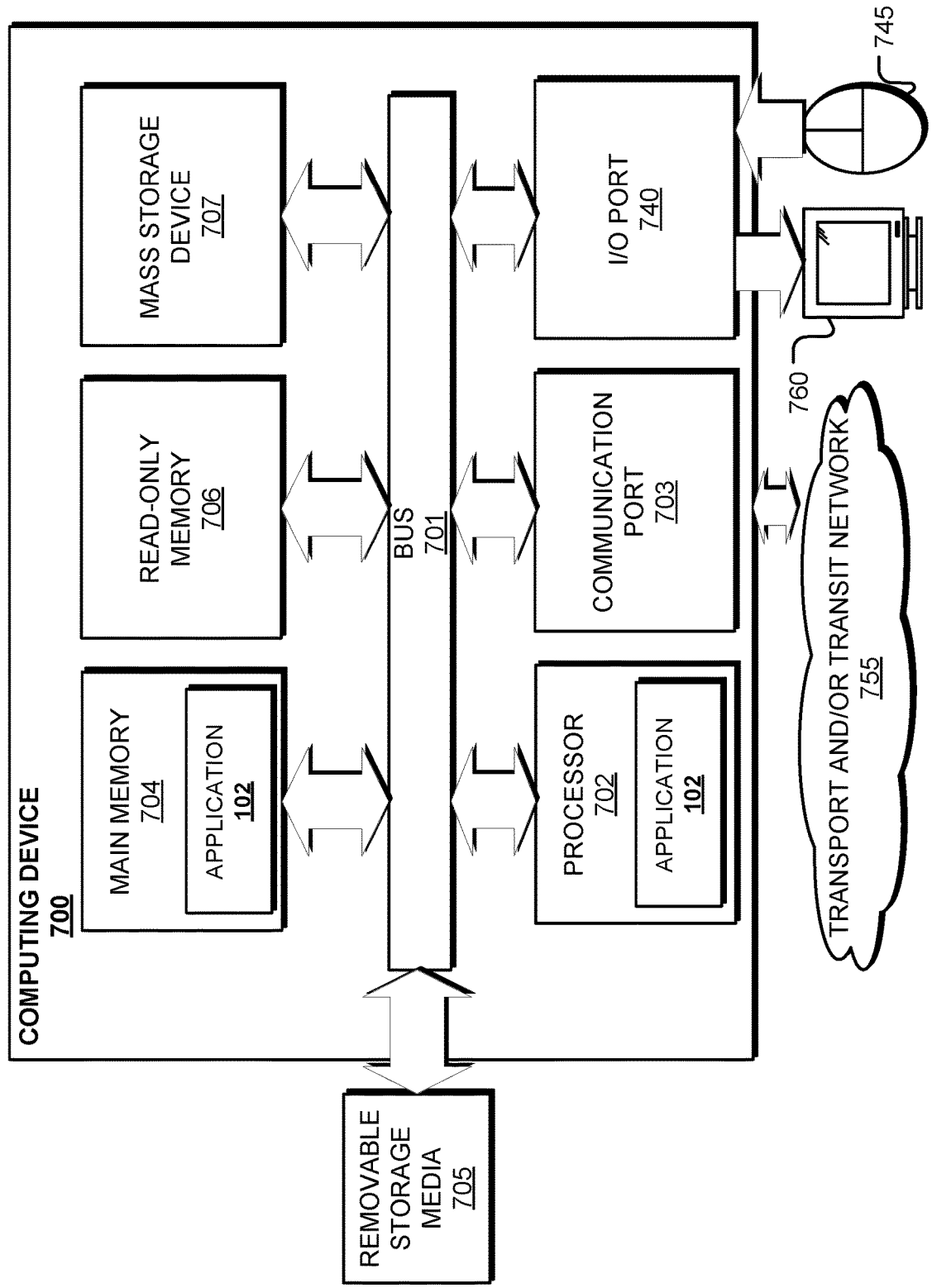
FIG. 18 is a simplified block diagram showing an example of a computing system that may implement various services, systems, and methods discussed herein.

FIG. 18 is an example schematic diagram of a computing device 700 that may implement various methodologies and functions discussed herein. For example, the computing device 700 may be configured by the application 102 to implement any embodiments of the described exploit prediction model. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer device 700 connects. Computing device may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc—Read Only Memory (CD-ROM), Compact Disc-Re-Writable (CD-RW), Digital Video Disk—Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the application 102 that supports functionality discussed above. In other words, aspects of the application 102 (and/or other resources as described herein) can be embodied as software code such as data and/or logic instructions (e.g., code stored in the memory or on another computer readable medium such as a disk) that supports functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the application 102 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for assessing a likelihood of exploitation of software vulnerabilities, comprising:
utilizing a processor in operable communication with at least one memory for storing instructions that are executed by the processor to perform operations, including:
accessing a plurality of datasets associated with a predetermined set of data sources, the plurality of datasets including training data comprising hacker communications;
accessing features from the plurality of datasets that include measures computed from social connections of users posting hacking-related content
applying learning algorithms to the training data to generate classification models that are configured to predict class labels defining a likelihood of exploitation of respective software vulnerabilities;
accessing one or more features associated with a software vulnerability; and
computing, by applying the one or more features to the classification model, a class label defining one or more values defining a likelihood of exploitation associated with the software vulnerability, wherein the likelihood of exploitation predicts an actual exploitation of the respective software vulnerabilities before disclosure based on the hacker communications from the training data.

2. The method of claim 1, further comprising generating a plurality of estimation outputs based on the one or more values to derive an overall quantitative score.

3. The method of claim 1, wherein the plurality of datasets include vulnerability data for vulnerabilities that are publicly disclosed and obtaining exploits data for exploits that were used in real world attacks.

4. The method of claim 3, further comprising:
aligning the exploits data with the vulnerability data; and
cleaning the exploits data of noise and predetermined portions of the exploits data that is irrelevant to associated software vulnerabilities.

5. The method of claim 1, wherein certain features correspond to a known vulnerability obtained from the plurality of datasets.

6. The method of claim 1, further comprising testing the classification models by applying additional training data and one or more algorithms and evaluation metrics to optimize the classification models until the classification models compute the likelihood of exploitation according to a predefined error rate.

7. The method of claim 1, further comprising vectorizing text features derived from the plurality of datasets using term frequency-inverse document frequency to create a vocabulary of associated words.

8. The method of claim 1, further comprising:
sorting vulnerabilities associated with the plurality of datasets according to time;
training the classification model using the training data, the training data defining a first subset of the plurality of datasets associated with a predetermined period of time; and
testing the classification model using a second subset of the plurality of datasets associated with the predetermined period of time.

9. The method of claim 1, further comprising computing mutual information from the plurality of datasets informative as to what information a given feature provides about another feature.

10. The method of claim 1, further comprising:
detecting, from the plurality of datasets, vulnerabilities that appear before an associated exploitation date.

11. The method of claim 1, further comprising:
accessing features from the plurality of datasets that measure a centrality of the users in a social graph.

12. The method of claim 1, further comprising:
accessing one or more features indicative of temporal connections between at least two of:
a time associated with discussion of a vulnerability by users posting hacking-related content at a web forum prior to disclosure to a public vulnerability database;
a time associated with disclosure of the vulnerability to the public vulnerability database; and
a time associated with exploitation of the vulnerability as obtained through exploits data associated with real-world exploitation of the vulnerability.

13. The method of claim 1, further comprising vectorizing text features derived from textual content of the plurality of datasets using a predetermined natural language process (NPL).

14. A computing device, configured via machine learning to apply a learned function to data associated with a software vulnerability to estimate a likelihood of exploitation of the software vulnerability, the learned function associated with a prediction model derived from at least one machine learning algorithm and a plurality of datasets associated with software vulnerabilities, the plurality of datasets including information associated with discussion of vulnerabilities by users posting hacking-related content, wherein the likelihood of exploitation predicts an actual exploitation of the software vulnerability before disclosure based on hacker communications from the plurality of datasets.

15. The computing device of claim 14, wherein the prediction model is at least one classification model that outputs from features of the software vulnerability a score indicative of the likelihood of exploitation.

16. The computing device of claim 14, wherein the predictive model includes a Random Forest (RF) method including multiple decision tree predictors applied in combination to classify the software vulnerability which is used to estimate the likelihood of exploitation.

17. The computing device of claim 14, wherein the computing device is further configured to apply the learned function to data associated with each of a plurality of new software vulnerabilities and compute a respective likelihood of exploitation for each of the plurality of new software vulnerabilities.

18. A method of prioritizing vulnerabilities using cyber threat intelligence, comprising:
- utilizing a processor in operable communication with at least one memory for storing instructions that are executed by the processor to perform operations including:
  - accessing a plurality of datasets associated with a predetermined set of data sources, at least a portion of the plurality of datasets defining training data including hacker communications;
  - applying learning algorithms to the training data to generate a predictive model configured to predict a likelihood of exploitation of respective software vulnerabilities;
  - accessing one or more features associated with a software vulnerability; and
  - computing, by applying the one or more features to the predictive model, one or more values defining a likelihood of exploitation associated with the software vulnerability, wherein the likelihood of exploitation predicts an actual exploitation of the respective software vulnerabilities before disclosure based on the hacker communications from the training data.

19. The method of claim 18, further comprising generating a plurality of estimation outputs based on the one or more values to derive an overall quantitative score.

20. The method of claim 18, wherein the plurality of datasets include vulnerability data for vulnerabilities that are publicly disclosed and obtaining exploits data for exploits that were used in real world attacks.

* * * * *